US012016021B2

(12) United States Patent
Xue et al.

(10) Patent No.: US 12,016,021 B2
(45) Date of Patent: Jun. 18, 2024

(54) REPORTING UPLINK CONTROL INFORMATION IN A RANDOM ACCESS PROCEDURE

(71) Applicant: QUALCOMM Incorporated, San Diego, CA (US)

(72) Inventors: Yisheng Xue, San Diego, CA (US); Xiaoxia Zhang, San Diego, CA (US); Sony Akkarakaran, Poway, CA (US); Ozcan Ozturk, San Diego, CA (US); Jing Sun, San Diego, CA (US); Tao Luo, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 16/821,728

(22) Filed: Mar. 17, 2020

(65) Prior Publication Data

US 2020/0322948 A1    Oct. 8, 2020

Related U.S. Application Data

(60) Provisional application No. 62/830,180, filed on Apr. 5, 2019.

(51) Int. Cl.
*H04W 72/21* (2023.01)
*H04J 3/02* (2006.01)
(Continued)

(52) U.S. Cl.
CPC .............. *H04W 72/21* (2023.01); *H04J 3/02* (2013.01); *H04W 74/0833* (2013.01)

(58) Field of Classification Search
None
See application file for complete search history.

(56) References Cited

U.S. PATENT DOCUMENTS 8,254,944 B2 * 8/2012 Kwon ................ H01Q 1/246
455/452.2
10,148,337 B2 * 12/2018 Ng ..................... H04W 72/0453
(Continued)

FOREIGN PATENT DOCUMENTS

WO   WO-2018025070 A1 *  2/2018 ............... H04B 7/06
WO   WO-2018031848 A1    2/2018

OTHER PUBLICATIONS

U.S. Appl. No. 62/825,645, Rastegardoost et al., filed Mar. 28, 2019, "Access Procedure in Handover", Fig. 23-25B and corresponding disclosure.*

(Continued)

*Primary Examiner* — Gregory B Sefcheck
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion. The UE may monitor for at least one of a random access response or a downlink communication subsequent to the random access response using the downlink beam indicated in the uplink control information. Numerous other aspects are provided.

29 Claims, 13 Drawing Sheets

(51) Int. Cl.
*H04W 74/08* (2009.01)
*H04W 74/0833* (2024.01)

(56) References Cited

U.S. PATENT DOCUMENTS

| | | | | |
|---|---|---|---|---|
| 10,270,514 | B2* | 4/2019 | Moon | H04B 7/0695 |
| 10,805,959 | B2* | 10/2020 | Akkarakaran | H04W 72/085 |
| 10,841,926 | B2* | 11/2020 | Tsai | H04B 7/0695 |
| 10,880,895 | B2* | 12/2020 | Gordaychik | H04W 8/22 |
| 10,893,544 | B2* | 1/2021 | Hakola | H04L 5/0048 |
| 10,959,282 | B1* | 3/2021 | Koskela | H04B 7/0617 |
| 10,966,271 | B2* | 3/2021 | Kaasalainen | H04B 7/0617 |
| 11,025,348 | B2* | 6/2021 | Nam | H04B 17/309 |
| 11,064,401 | B2* | 7/2021 | Xiong | H04W 36/0058 |
| 11,178,696 | B2* | 11/2021 | Kim | H04W 56/00 |
| 11,212,844 | B2* | 12/2021 | Kim | H04W 74/006 |
| 11,234,273 | B2 | 1/2022 | Islam et al. | |
| 11,395,343 | B2* | 7/2022 | Vos | H04L 1/1861 |
| 11,405,145 | B2* | 8/2022 | Xiong | H04L 5/10 |
| 2017/0359114 | A1 | 12/2017 | Akkarakaran et al. | |
| 2018/0309496 | A1* | 10/2018 | Lee | H04L 5/0044 |
| 2019/0029049 | A1* | 1/2019 | Akkarakaran | H04W 72/542 |
| 2019/0053271 | A1 | 2/2019 | Islam et al. | |
| 2019/0082335 | A1* | 3/2019 | Yu | H04B 7/0695 |
| 2019/0327769 | A1* | 10/2019 | Yang | H04W 56/001 |
| 2019/0350028 | A1* | 11/2019 | Kaasalainen | H04B 7/0617 |
| 2020/0260485 | A1* | 8/2020 | Lei | H04W 72/14 |
| 2020/0305197 | A1* | 9/2020 | Kim | H04W 74/0833 |
| 2020/0314913 | A1* | 10/2020 | Rastegardoost | H04W 74/006 |
| 2020/0383141 | A1* | 12/2020 | Lei | H04W 8/24 |
| 2020/0404559 | A1* | 12/2020 | Koskela | H04W 36/36 |
| 2021/0014011 | A1* | 1/2021 | Xiong | H04W 74/0833 |
| 2021/0168862 | A1* | 6/2021 | Murray | H04W 74/002 |
| 2021/0176678 | A1* | 6/2021 | Isokangas | H04W 36/00837 |
| 2021/0227592 | A1* | 7/2021 | Frederiksen | H04W 74/0833 |
| 2022/0150956 | A1* | 5/2022 | Xiong | H04L 5/0023 |

OTHER PUBLICATIONS

Ericsson: "Power Headroom reporting," 3GPP Draft, 3GPP TSG RAN WG1 Meeting 91, R1-1721030, Power Headroom reporting, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051370391, 4 pages, Retrieved from the Internet: URL: http://www.3gpp.org/ftp/tsg%5Fran/WG1%5FRL1/TSGR1%5F91/Docs/ retrieved on [Nov. 18, 2017], section 2.
International Search Report and Written Opinion—PCT/US2020/023321—ISA/EPO—Aug. 11, 2020.
Partial International Search Report—PCT/US2020/023321—ISA/EPO—Jun. 18, 2020.
Interdigital Inc: "Perspectives on Operation of Two-Step RACH," 3GPP Draft, 3GPP TSG RAN WG1 #96, R1-1902583, Perspectives on Operation of Two-Step RACH, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 16, 2019 (Feb. 16, 2019), XP051600276, 5 pages, section.
Qualcomm Incorporated: "Procedures for Two-Step RACH", 3GPP TSG-RAN WG1 Meeting #96Bis, R1-1904993, 3GPP, Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 7, 2019, Mar. 30, 2019, XP051691916, pp. 1-12, Sec 1-3, Sec 1-3, 2-7, Sec "3.1 RO Configurations for msgA" and "6. Fall-Back Procedures for Two-Step RACH".
ZTE, et al., "Considerations on 2-Step RACH Procedures", 3GPP Draft, 3GPP TSG RAN WG1 Meeting #96, R1-1901627, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051599324, 11 pages, pg 1, fig 1 p. 2, para 2.1 p. 4, para 3.1 p. 8, para 3.5—p. 9, p. 3, line 10-line 20.

* cited by examiner

REPORTING UPLINK CONTROL INFORMATION IN A RANDOM ACCESS PROCEDURE

CROSS-REFERENCE TO RELATED APPLICATION

This Patent Application claims priority to U.S. Provisional Patent Application No. 62/830,180, filed on Apr. 5, 2019, entitled "REPORTING UPLINK CONTROL INFORMATION IN A RANDOM ACCESS PROCEDURE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for reporting uplink control information (UCI) in a random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion; and monitoring for at least one of a random access response or a downlink communication subsequent to the random access response using the downlink beam indicated in the uplink control information.

In some aspects, a method of wireless communication, performed by a UE, may include transmitting at least one of a power headroom report or a buffer status report in uplink control information of a random access message; and monitoring for at least one of a random access response or a downlink communication subsequent to the random access response based at least in part on the power headroom report or the buffer status report.

In some aspects, a UE for wireless communication may include memory and one or more processors operatively coupled to the memory. The memory and the one or more processors may be configured to transmit an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion; and monitor for at least one of a random access response or a downlink communication subsequent to the random access response using the downlink beam indicated in the uplink control information.

In some aspects, a UE for wireless communication may include memory and one or more processors operatively coupled to the memory. The memory and the one or more processors may be configured to transmit at least one of a power headroom report or a buffer status report in uplink control information of a random access message; and monitor for at least one of a random access response or a downlink communication subsequent to the random access response based at least in part on the power headroom report or the buffer status report.

In some aspects, a non-transitory computer-readable medium may store one or more instructions for wireless communication. The one or more instructions, when executed by one or more processors of a UE, may cause the one or more processors to: transmit an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion; and monitor for at least one of a random access response or a downlink communication subsequent to the random access response using the downlink beam indicated in the uplink control information.

In some aspects, a non-transitory computer-readable medium may store one or more instructions for wireless communication. The one or more instructions, when executed by one or more processors of a UE, may cause the one or more processors to: transmit at least one of a power headroom report or a buffer status report in uplink control information of a random access message; and monitor for at least one of a random access response or a downlink communication subsequent to the random access response based at least in part on the power headroom report or the buffer status report.

In some aspects, an apparatus for wireless communication may include means for transmitting at least one of a power headroom report or a buffer status report in uplink control information of a random access message; and means for monitoring for at least one of a random access response or a downlink communication subsequent to the random access response based at least in part on the power headroom report or the buffer status report.

In some aspects, an apparatus for wireless communication may include means for transmitting an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion; and means for monitoring for at least one of a random access response or a downlink communication subsequent to the random access response using the downlink beam indicated in the uplink control information.

In some aspects, a method of wireless communication, performed by a base station, may include receiving at least one of a power headroom report or a buffer status report in uplink control information of a random access message; and transmitting at least one of a random access response or a downlink communication subsequent to the random access response based at least in part on the power headroom report or the buffer status report.

In some aspects, a method of wireless communication, performed by a base station, may include receiving an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion; and transmitting at least one of a random access response or a downlink communication subsequent to the random access response using the downlink beam indicated in the uplink control information.

In some aspects, a base station for wireless communication may include memory and one or more processors operatively coupled to the memory. The memory and the one or more processors may be configured to receive an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion; and transmit at least one of a random access response or a downlink communication subsequent to the random access response using the downlink beam indicated in the uplink control information.

In some aspects, a base station for wireless communication may include memory and one or more processors operatively coupled to the memory. The memory and the one or more processors may be configured to receive at least one of a power headroom report or a buffer status report in uplink control information of a random access message; and transmit at least one of a random access response or a downlink communication subsequent to the random access response based at least in part on the power headroom report or the buffer status report.

In some aspects, a non-transitory computer-readable medium may store one or more instructions for wireless communication. The one or more instructions, when executed by one or more processors of a base station, may cause the one or more processors to: receive an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion; and transmit at least one of a random access response or a downlink communication subsequent to the random access response using the downlink beam indicated in the uplink control information.

In some aspects, a non-transitory computer-readable medium may store one or more instructions for wireless communication. The one or more instructions, when executed by one or more processors of a base station, may cause the one or more processors to: receive at least one of a power headroom report or a buffer status report in uplink control information of a random access message; and transmit at least one of a random access response or a downlink communication subsequent to the random access response based at least in part on the power headroom report or the buffer status report.

In some aspects, an apparatus for wireless communication may include means for receiving an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion; and means for transmitting at least one of a random access response or a downlink communication subsequent to the random access response using the downlink beam indicated in the uplink control information.

In some aspects, an apparatus for wireless communication may include means for receiving at least one of a power headroom report or a buffer status report in uplink control information of a random access message; and means for transmitting at least one of a random access response or a downlink communication subsequent to the random access response based at least in part on the power headroom report or the buffer status report.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
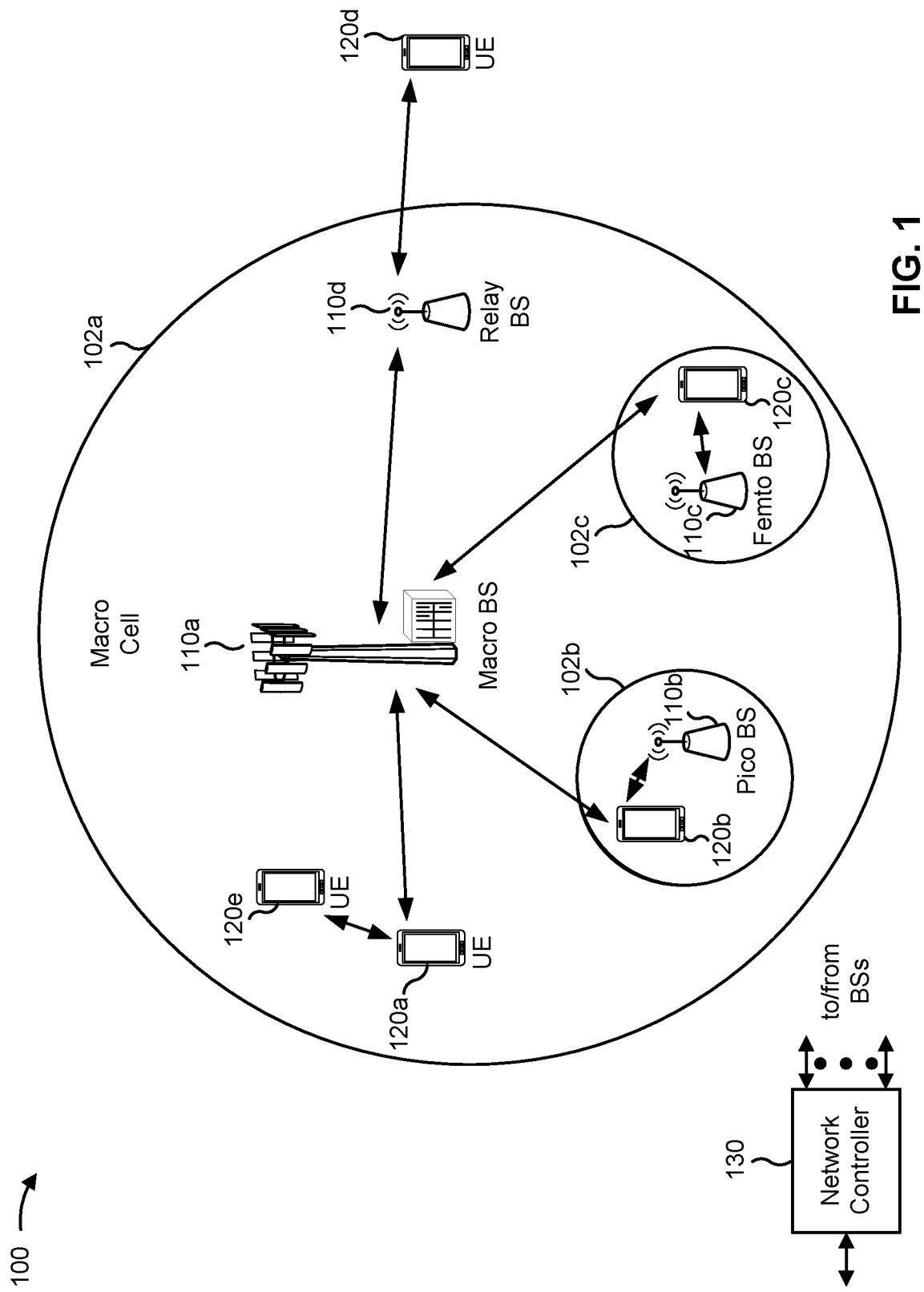
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
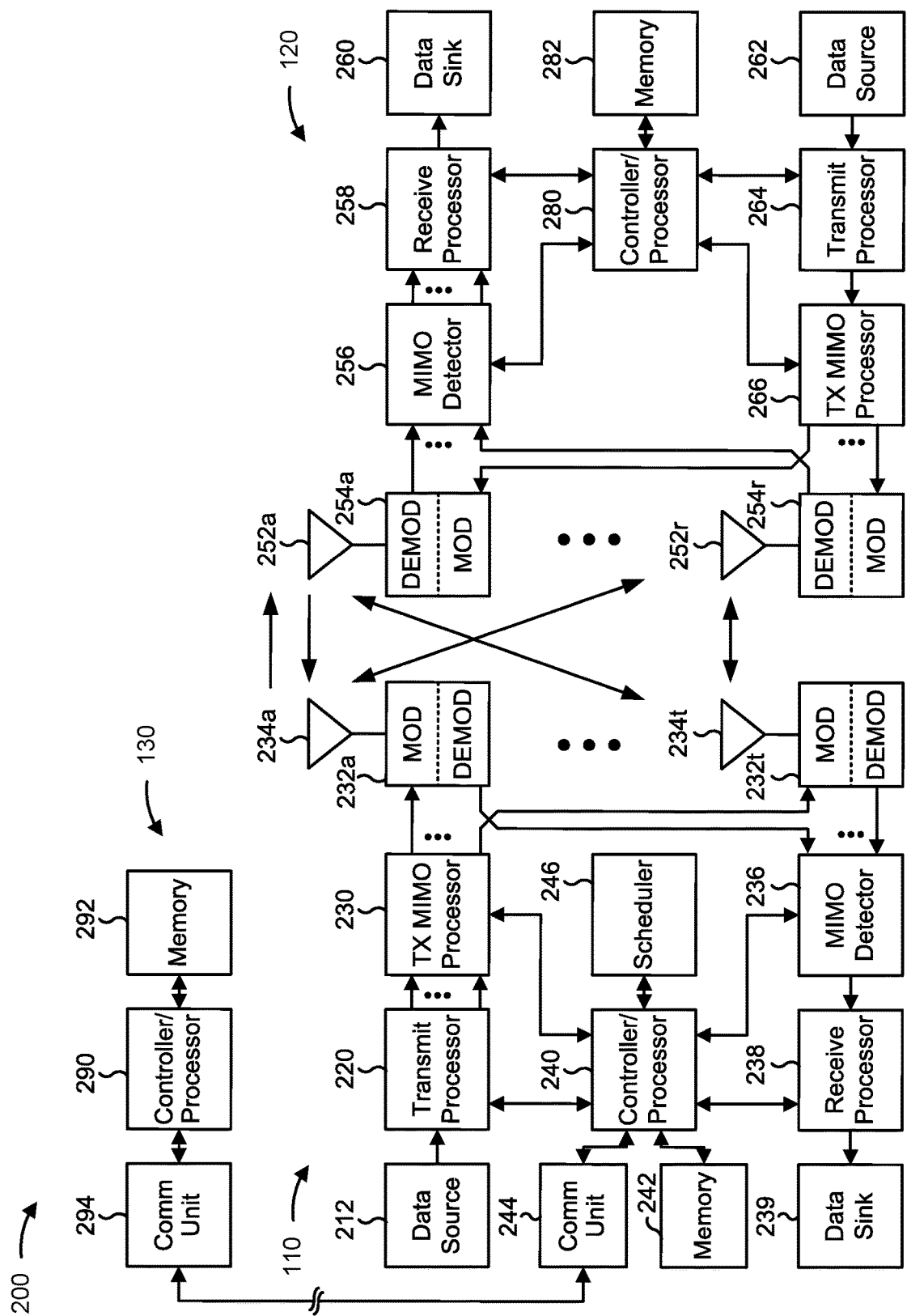
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reporting uplink control information (UCI) in a random access procedure, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion; means for monitoring for at least one of a random access response or a downlink communication subsequent to the random access response using the downlink beam indicated in the uplink control information; and/or the like. Additionally, or alternatively, UE 120 may include means for transmitting at least one of a power headroom report or a buffer status report in uplink control information of a random access message; means for monitoring for at least one of a random access response or a downlink communication subsequent to the random access response based at least in part on the power headroom report or the buffer status report; and/or the like. In some aspects, such means may include one or more components of UE 120 described in connection with FIG. 2.

In some aspects, base station 110 may include means for receiving an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion; means for transmitting at least one of a random access response or a downlink communication subsequent to the random access response using the downlink beam indicated in the uplink control information; and/or the like. Additionally, or alternatively, UE 120 may include means for receiving at least one of a power headroom report or a buffer status report in uplink control information of a random access message; means for transmitting at least one of a random access response or a downlink communication subsequent to the random access response based at least in part on the power headroom report or the buffer status report; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
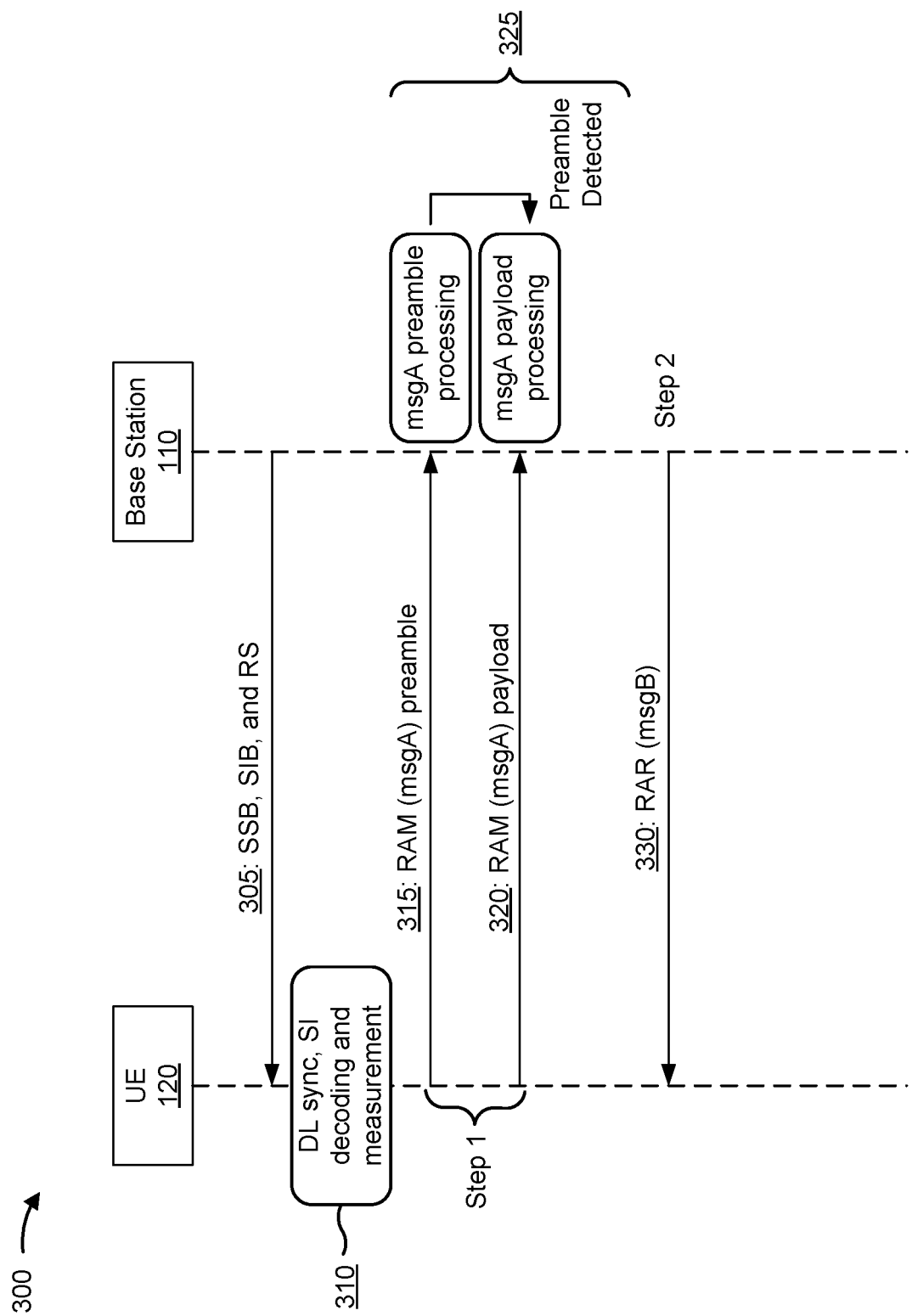
FIG. 3 is a diagram illustrating an example of a two-step random access channel (RACH) procedure.

FIG. 3 is a diagram illustrating an example 300 of a two-step random access channel (RACH) procedure. As shown in FIG. 3, a base station 110 and a UE 120 may communicate with one another to perform the two-step RACH procedure.

In a first operation 305, the base station 110 may transmit, and the UE 120 may receive, one or more synchronization signal blocks (SSBs), system information (e.g., in one or more system information blocks (SIBs) and/or the like), and/or one or more reference signals (RSs) (e.g., channel state information reference signals (CSI-RSs) and/or the like). In a second operation 310, the UE 120 may perform downlink (DL) synchronization (such as by using one or more SSBs), may decode system information (SI) that is included in one or more SIBs, and/or may perform one or more measurements of the RS(s). Based at least in part on performing the second operation 310, the UE 120 may determine parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, may determine a downlink beam for the RACH procedure (e.g., a default downlink beam and/or a preferred downlink beam), and/or the like.

In a third operation 315, the UE 120 may transmit a RAM preamble. In a fourth operation 320, the UE 120 may transmit a RAM payload. As shown, the UE 120 may transmit the RAM preamble and the RAM payload as part of a first step of the two-step RACH procedure. The RAM is sometimes referred to as message A, msgA, or a first message in a two-step RACH procedure. The RAM preamble is sometimes referred to as a message A preamble, a msgA preamble, or a preamble. The RAM payload is sometimes referred to as a message A payload, a msgA payload, or a payload. The RAM may include some or all of the contents of message 1 (msg1) and message 3 (msg3) of a four-step RACH procedure. For example, the RAM preamble may include some or all contents of message 1 (such as a RACH preamble). The RAM payload may include some or all contents of message 3 (such as a UE identifier, uplink control information, a physical uplink shared channel (PUSCH) communication, and/or the like).

In a fourth operation 325, the base station 110 may receive the RAM preamble transmitted by the UE 120. If the base station 110 successfully receives and decodes the RAM preamble, the base station 110 may then receive and decode the RAM payload. In a fifth operation 330, the base station 110 may transmit a random access response (RAR) (sometimes referred to as a RAR message). As shown, the base station 110 may transmit the RAR message as part of a second step of the two-step RACH procedure. The RAR message is sometimes referred to as message B, msgB, or a second message in a two-step RACH procedure. The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, and/or the like.

As indicated above, FIG. 3 is provided as an example. Other examples may differ from what is described with regard to FIG. 3.

Figure 4:
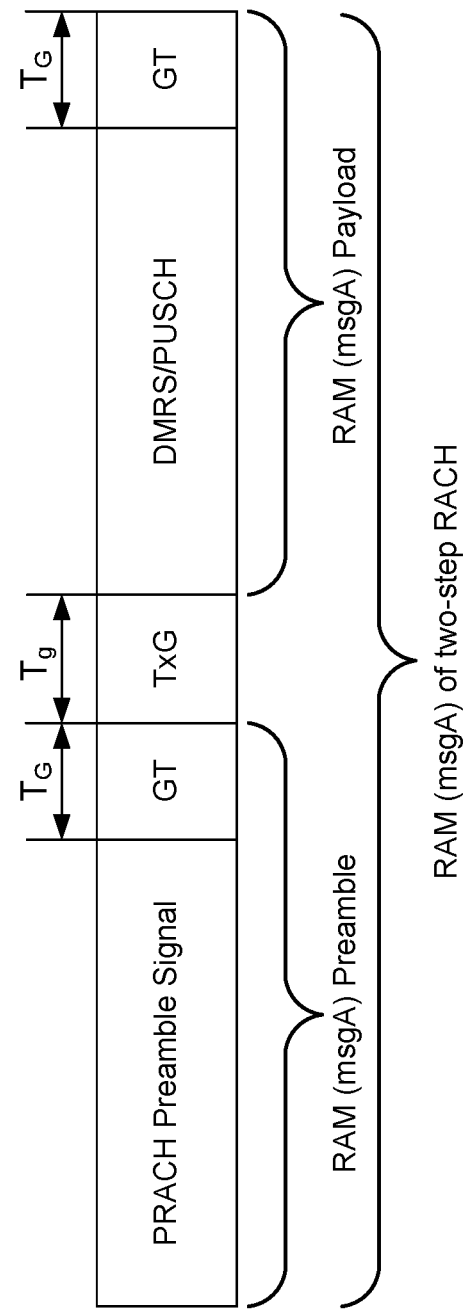
FIG. 4 is a diagram illustrating an example of a random access message that includes a random access message preamble and a random access message payload.

FIG. 4 is a diagram illustrating an example 400 of a random access message that includes a random access message preamble and a random access message payload. As shown, the RAM of the two-step RACH procedure may include a RAM preamble and a RAM payload, as described above. The RAM preamble may include a PRACH preamble signal and a guard time (shown as GT, with a duration of $T_G$). The RAM payload may include a demodulation reference signal (DMRS) and/or a physical uplink shared channel (PUSCH) communication, as well as a guard time (also shown as GT, with a duration of $T_G$). As further shown, transmission of the RAM preamble and transmission of the RAM payload may be separated in time by a transmission guard time (shown as TxG, with a duration of $T_g$).

In some cases, performance of a wireless communication network may be improved by transmitting UCI, that may typically be transmitted after a RACH procedure is complete, in the RAM payload (e.g., in the PUSCH used for the RAM payload). For example, performance of the RACH procedure may be improved by such early reporting of UCI. Some techniques and apparatuses described herein permit a UE 120 to report a preferred downlink beam, a power headroom report, a buffer status report, and/or the like in UCI of a random access message (e.g., the RAM payload). A base station 110 may use this information to improve RACH communications and/or communications subsequent to the RACH procedure, such as by configuring and/or transmitting such communications based at least in part on the UCI received from the UE 120 in the random access message. Additional details are described below.

As indicated above, FIG. 4 is provided as an example. Other examples may differ from what is described with regard to FIG. 4.

Figure 5:
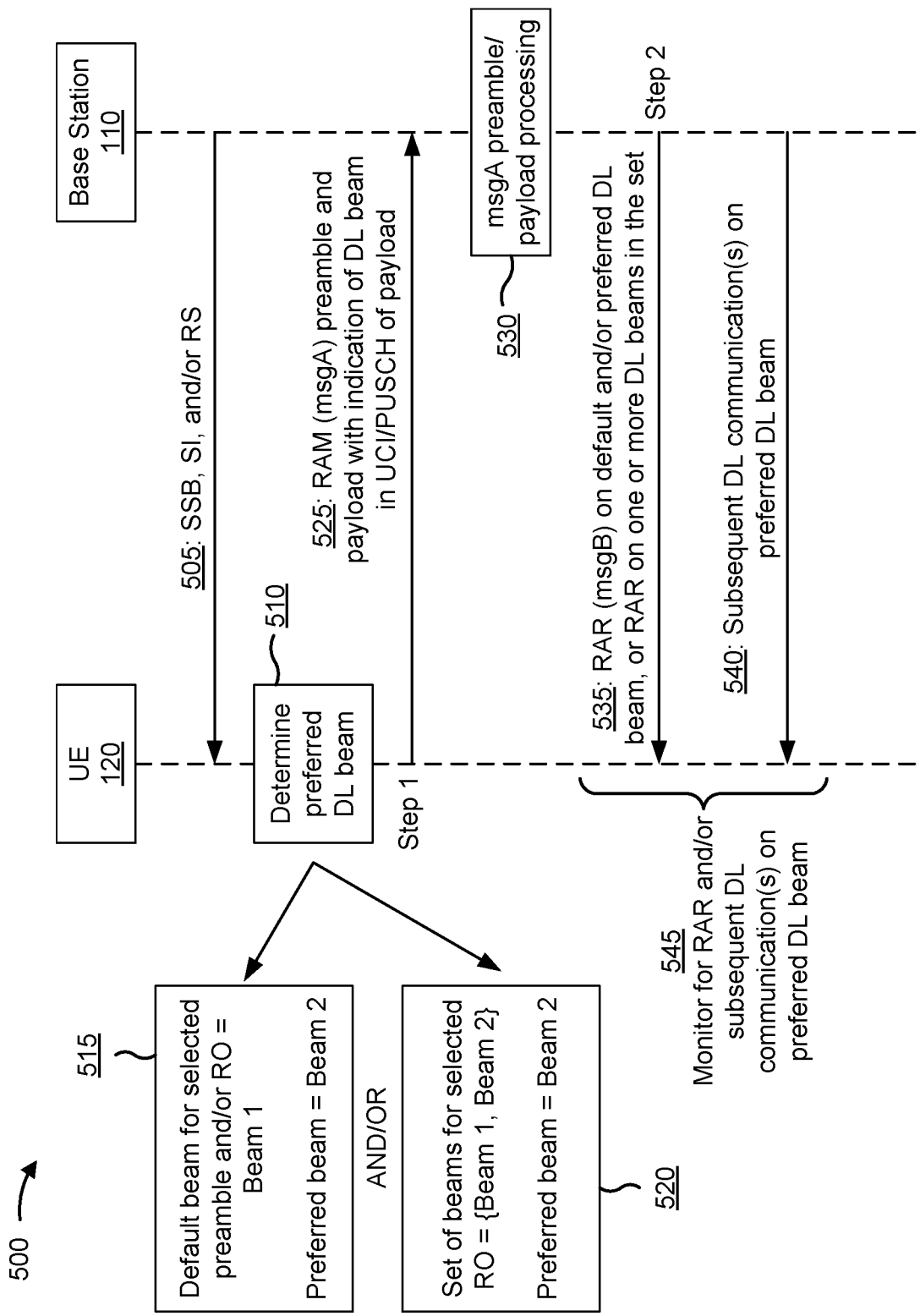
FIGS. 5-9 are diagrams illustrating examples of reporting uplink control information (UCI) in a random access procedure, in accordance with various aspects of the present disclosure.

FIG. 5 is a diagram illustrating an example 500 of reporting UCI in a random access procedure, in accordance with various aspects of the present disclosure. As shown in FIG. 5, a UE 120 and a base station 110 may communicate with one another to perform a 2-step RACH procedure.

In a first operation 505, the base station 110 may transmit, and the UE 120 may receive, one or more SSBs, system information (e.g., in one or more (SIBs) and/or the like), and/or one or more RSs (e.g., CSI-RSs and/or the like). In some aspects, different SSBs may be transmitted via different downlink beams, such as by using a beam-sweeping procedure.

In a second operation 510, the UE 120 may determine a preferred downlink (DL) beam for communications with the base station 110 (e.g., for downlink communications from the base station 110 to the UE 120. The UE 120 may determine the preferred downlink beam based at least in part on the SSB(s), the CSI-RS(s), and/or the like. For example, the UE 120 may measure one or more SSBs to determine an SSB with the best measurements, and may identify an SSB index of that SSB. The SSB index may correspond to a downlink beam via which the SSB was transmitted. Additionally, or alternatively, the UE 120 may measure CSI-RS on one or more downlink beams, and may select a preferred downlink beam based at least in part on the measurements (e.g., the downlink beam with the best CSI-RS measurements).

As shown by reference number 515, in some aspects, the UE 120 may identify a preferred downlink beam that is different from a default downlink beam associated with a preamble to be used by the UE 120 in a random access message (e.g., a RAM preamble) and/or associated with a random access occasion (e.g., one or more time resources, one or more frequency resources, and/or the like) in which the UE 120 is to transmit the random access message.

In some cases, a random access occasion may correspond to a single default downlink beam. The correspondence between random access occasions and default downlink beams may be indicated in system information, may be prespecified (e.g., according to a wireless communication standard), and/or the like. In this case, when the UE 120 transmits a random access message (e.g., msgA) in a random access occasion, the base station 110 may transmit a random access response (e.g., msgB) via the default downlink beam corresponding to the random access occasion, and the UE 120 may monitor the default downlink beam for the random access response.

However, this may require the UE 120 to either wait to transmit the random access message in a random access occasion corresponding to a default beam that is the best beam identified by the UE 120, or to transmit the random access message (without waiting) in a random access occasion corresponding to a sub-optimal downlink beam. By identifying a preferred downlink beam that is different from the default downlink beam and indicating the preferred downlink beam in UCI of the random access message (as described below), the UE 120 can achieve early transmission of the random access message in a random access occasion corresponding to an optimal downlink beam identified by the UE 120 (e.g., the preferred downlink beam).

In example 500, the UE 120 is shown as identifying Beam 2 as the preferred downlink beam. In this case, Beam 1 may be the default downlink beam for the random access occasion (e.g., for all preambles, such as for 64 preambles when the UE 120 is permitted to select from a set of 64 preambles). Here, the UE 120 selects Beam 2, which is different from the default downlink beam associated with the random access occasion.

In some cases, a random access occasion may correspond to multiple default downlink beams, and a set of preambles (e.g., random access preambles, RAM preambles, RACH preambles, and/or the like) may be partitioned into multiple subsets of preambles corresponding to the multiple default downlink beams. As indicated above, the correspondence between a default downlink beam and a corresponding combination of a random access occasion and a subset of preambles may be indicated in system information, may be prespecified, and/or the like. In this case, when the UE 120 transmits a random access message (e.g., msgA) with a selected preamble in a random access occasion, the base station 110 may transmit a random access response (e.g., msgB) via the default downlink beam corresponding to the random access occasion and the selected preamble, and the UE 120 may monitor the default downlink beam for the random access response.

However, this may still require the UE 120 to either wait to transmit the random access message in a random access occasion that is associated with a default beam (e.g., among different default beams corresponding to different sets of preambles) that is the best beam identified by the UE 120, or to transmit the random access message (without waiting) in a random access occasion corresponding to a sub-optimal downlink beam. Furthermore, such preamble partitioning limits the number of possible preambles that can be used for a corresponding downlink beam, thereby increasing the likelihood of a preamble collision. By identifying a preferred downlink beam that is different from the default downlink beams associated with a random access occasion and indicating the preferred downlink beam in UCI of the random access message (as described below), the UE 120 can achieve early transmission of the random access message in a random access occasion corresponding to an optimal downlink beam identified by the UE 120 (e.g., the preferred downlink beam). Furthermore, preamble partitioning can be avoided, thereby reducing the likelihood of a preamble collision.

In example 500, the UE 120 is shown as identifying Beam 2 as the preferred downlink beam. In this case, Beam 0 may be the default downlink beam for a first subset of preambles associated with the random access occasion (e.g., preambles 0 through 31), and Beam 1 may be the default downlink beam for a second subset of preambles associated with the random access occasion (e.g., for preambles 32 through 63). Here, the UE 120 selects Beam 2, which is different from the default downlink beam associated with the random access occasion.

As shown by reference number 520, in some aspects, the UE 120 may select a preferred downlink beam from a set of multiple downlink beams associated with the random access occasion. In this case, preamble partitioning may be avoided by permitting the UE 120 to select any one of the multiple downlink beams and any preamble for the random access message. In other words, a downlink beam in the set of multiple downlink beams can be selected by the UE 120 regardless of a preamble selected by the UE 120. In some aspects, the correspondence between the random access occasion and the set of multiple downlink beams may be indicated in system information, may be prespecified (e.g., according to a wireless communication standard), and/or the like.

In example 500, the set of downlink beams associated with a selected random access occasion is shown as {Beam 1, Beam 2}, representing Beam 1 and Beam 2. Here, the UE 120 selects Beam 2 from the set (e.g., the UE 120 identifies Beam 2 as the preferred downlink beam). In some aspects, the UE 120 may identify the preferred downlink beam, and may then identify a random access occasion corresponding to a set of downlink beams that includes the preferred downlink beam. The UE 120 may transmit a random access message in the random access occasion (e.g., using any permitted preamble), and may indicate the preferred downlink beam in UCI of the random access message. In some cases, the UE 120 may still need to wait for a random access occasion corresponding to a set of downlink beams that includes the preferred downlink beam, but such a wait may be reduced as compared to a scenario where each random access occasion corresponds to a single downlink beam. Furthermore, this configuration may reduce system complexity.

In a third operation 525, the UE 120 may transmit an indication of the preferred downlink beam in UCI of a random access message. For example, the random access message may be msgA, and may include a RAM preamble and a RAM payload. The UE 120 may transmit the indication of the preferred downlink beam in the RAM payload, such as in UCI of the RAM payload (e.g., in a PUSCH communication included in the RAM payload and/or in a media access control (MAC) protocol data unit (PDU)). In some aspects, the UE 120 may indicate the preferred downlink beam using an index. The index may include a beam index, an index indicated in an SSB transmitted via the preferred downlink beam, and/or the like. Additionally, or alternatively, if the random access occasion is associated with a set of multiple downlink beams, then the index may identify the preferred downlink beam from the set of multiple downlink beams (e.g., a first downlink beam in the set may be identified using a first index, a second downlink beam in the set may be identified using a second index, and so on).

In a fourth operation 530, the base station 110 may receive the random access message (msgA). For example, the base station 110 may receive the RAM preamble and/or the RAM payload. If the base station 110 successfully receives and decodes the RAM preamble, the base station 110 may then receive and decode the RAM payload.

In a fifth operation 535, the base station 110 may transmit a random access response (RAR), such as msgB or msg2. In some aspects, the base station 110 may transmit the RAR on the preferred downlink beam indicated by the UE 120. Alternatively, the base station 110 may transmit the RAR on a default downlink beam associated with the random access occasion and/or the preamble used by the UE 120. In some aspects, the base station 110 may transmit the RAR on both the default downlink beam and the preferred downlink beam to achieve performance improvements associated with spatial diversity. In some aspects, the random access occasion may be associated with a set of multiple downlink beams (which may or may not include a default beam for the random access occasion), and the base station 110 may transmit the RAR on more than one downlink beam included in the set (e.g., on all downlink beams included in the set) to achieve performance improvements associated with spatial diversity.

In a sixth operation 540, the base station 110 may transmit a subsequent DL communication using the preferred downlink beam indicated by the UE 120. The subsequent DL communication may include one or more messages that follow the RAR and/or that follow the RACH procedure, such as a physical downlink control channel (PDCCH) communication, a physical downlink shared channel (PDSCH) communication, a radio resource control (RRC) message (e.g., an RRC configuration message), and/or the like.

In a seventh operation 545, the UE 120 may monitor for the RAR on the default downlink beam and/or the preferred downlink beam, such as when the random access occasion is associated with a single default downlink beam. In some aspects, to reduce system complexity, the UE 120 may be configured or required to monitor for the RAR on only the default downlink beam and not the preferred downlink beam. In this case, the default downlink beam may be used to transmit and/or receive the RAR, and the preferred downlink beam may be used to transmit and/or receive the one or more subsequent DL communications.

In some aspects, such as when the random access occasion is associated with a single default downlink beam, the UE 120 may monitor for the RAR on only the preferred downlink beam and not the default downlink beam. However, in some cases, this may result in the UE 120 missing the RAR if the base station 110 could not decode the UCI indicating the preferred downlink beam, in which case the base station 110 may transmit the RAR on the default downlink beam. Thus, in some aspects, the UE 120 may monitor for the RAR on both the preferred downlink beam and the default downlink beam. For example, the base station 110 may indicate (e.g., in system information, such as a SIB, remaining minimum system information (RMSI), and/or the like) a time division multiplexing (TDM) pattern to be used by the UE 120 to monitor different downlink beams for the RAR. The TDM pattern may indicate a first set of time domain resources (e.g., transmission time intervals (TTIs), such as slots, subframes, and/or the like) in which the default downlink beam is to be monitored, and may indicate a second set of time domain resources in which the preferred downlink beam is to be monitored. In some aspects, the first set of time domain resources and the second set of time domain resources may be mutually exclusive. For example, the first set of time domain resources may be even slots, and the second set of time domain resources may be odd slots, or vice versa.

Additionally, or alternatively, the UE 120 may monitor for the RAR on the preferred downlink beam and/or one or more other downlink beams included in a set of multiple downlink beams associated with a random access occasion. In some aspects, to reduce system complexity, the UE 120 may be configured or required to monitor for the RAR on only the preferred downlink beam and not any other downlink beams included in the set. However, in some cases, this may result in the UE 120 missing the RAR if the base station 110 could not decode the UCI indicating the preferred downlink beam, in which case the base station 110 may transmit the RAR on a different downlink beam included in the set (e.g., the set could include a default beam and one or more other beams). Thus, in some aspects, the UE 120 may monitor for the RAR on the preferred downlink beam and one or more other downlink beams included in the set. In a similar manner as described above, the base station 110 may indicate a TDM pattern to be used by the UE 120 to monitor different downlink beams for the RAR. The TDM pattern may indicate a first set of time domain resources in which the preferred downlink beam is to be monitored, may indicate a second set of time domain resources in which another downlink beam in the set is to be monitored, and so on (e.g., for all or a subset of beams included in the set), in a similar manner as indicated above.

As further shown in the seventh operation 545, the UE 120 may monitor for the subsequent DL communication(s) on the preferred downlink beam. The subsequent DL communication(s) may include one or more messages that follow the RAR and/or that follow the RACH procedure, such as a PDCCH communication, a PDSCH communication, an RRC message, and/or the like. By indicating the preferred downlink beam in the random access message and receiving one or more communications from the base station 110 (e.g., the RAR and/or one or more subsequent DL communications) via the preferred downlink beam, performance may be improved. For example, communications via the preferred beam may have a higher throughput, a lower latency, a higher reliability, and/or the like as compared to communications via a non-preferred beam.

Although some operations are described above in connection with indicating a preferred downlink beam (e.g., a single preferred downlink beam) in UCI of a random access message, in some aspects, the UE 120 may indicate multiple downlink beams (e.g., including a preferred downlink beam) in the UCI of the random access message. For example, the UE 120 may indicate a set of indexes corresponding to a set of beams. In some aspects, the UE 120 may indicate, in the UCI, a ranking for the set of indexes corresponding to the set of beams such that a list of beams from most-preferred to least-preferred is indicated to the base station 110. In some aspects, the UE 120 may determine whether to identify a beam in the list based at least in part on whether the beam satisfies a condition (e.g., a signal quality threshold, a signal power threshold, a reference signal received power (RSRP) threshold, a reference signal received quality (RSRQ) threshold, a signal-to-interference-plus-noise ratio (SINR) threshold, and/or the like). In some aspects, the list may include or may exclude a default beam associated with a random access occasion in which the random access message is transmitted.

Additionally, or alternatively, the UE 120 may indicate, in the UCI, one or more parameters for one or more of the beams included in the list, such as a measured signal quality, a measured signal power, a measured RSRP parameter, a measured RSRQ parameter, a measured SINR parameter, and/or the like. Additionally, or alternatively, the UE 120 may indicate, in the UCI, whether the beam corresponds to an SSB (and/or which SSB) or to a CSI-RS (and/or which CSI-RS) (e.g., if CSI-RS is configured for the UE 120.

In some aspects, the base station 110 may indicate (e.g., in system information), a TDM pattern for monitoring different downlink beams for a RAR, as indicated above. In this case, when the UE 120 indicates multiple downlink beams in the UCI, the UE 120 may then monitor the indicated downlink beams according to the TDM pattern. For example, the UE 120 may monitor a first downlink beam, included in the multiple indicated downlink beams, on a first set of time domain resources, the UE 120 may monitor a second downlink beam, included in the multiple indicated downlink beams, on a second set of time domain resources, and so on, in a similar manner as described above. In some aspects, the base station 110 may be permitted to send the RAR on any single indicated downlink beam for scheduling flexibility. Additionally, or alternatively, the base station 110 may send the RAR on multiple downlink beams (e.g., all indicated downlink beams or a subset of the multiple downlink beams) for spatial diversity gains. However, in some aspects, to reduce system complexity, the UE 120 may be configured or required to monitor for the RAR on only a default downlink beam and not any other indicated beam. In this case, the default downlink beam may be used to transmit and/or receive the RAR, and one or more other downlink beams in the list (e.g., the best beam) may be used to transmit and/or receive the one or more subsequent DL communications.

Additionally, or alternatively, when the UE 120 indicates multiple downlink beams in UCI of the random access message, the base station 110 may indicate a set of downlink beams in the RAR. The set of downlink beams in the RAR may include all of the downlink beams indicated in the random access message or a subset of the downlink beams indicated in the random access message. The UE 120 may monitor the downlink beams indicated in the RAR according to a TDM pattern. As described above, in some aspects, the TDM pattern may be indicated in system information. Alternatively, the TDM pattern may be indicated in the RAR.

In some aspects, in addition to indicating a preferred downlink beam in the UCI of the random access message, the UE 120 may transmit a power headroom report (PHR) and/or a buffer status report (BSR) in the UCI of the random access message, as described in more detail elsewhere herein. The base station 110 may use the PHR and/or the BSR to configure and/or transmit the RAR and/or one or more subsequent downlink communications, as described in more detail elsewhere herein.

As indicated above, FIG. 5 is provided as an example. Other examples may differ from what is described with regard to FIG. 5.

Figure 6:
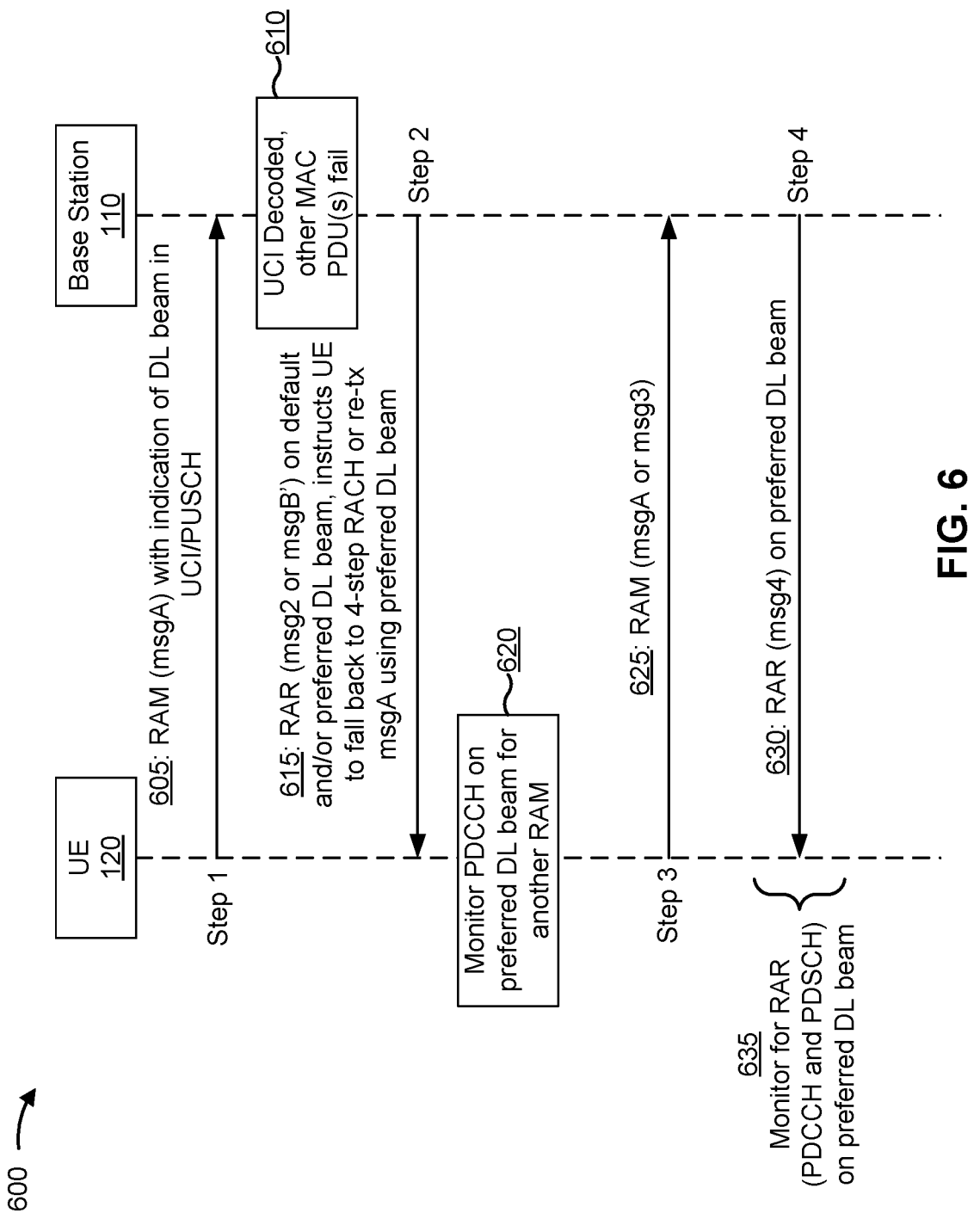

FIG. 6 is a diagram illustrating another example 600 of reporting UCI in a random access procedure, in accordance with various aspects of the present disclosure. As shown in FIG. 6, a UE 120 and a base station 110 may communicate with one another to perform a 2-step RACH procedure (but may fall back to a 4-step RACH procedure in some aspects).

In a first operation 605, the UE 120 may transmit an indication of the preferred downlink beam in UCI of a random access message (e.g., a first random access message), as described above in connection with FIG. 5.

In a second operation 610, the base station 110 may receive the random access message, and may attempt to decode the random access message. In some cases, the base station 110 may successfully decode the UCI (e.g., that indicates the preferred downlink beam), but may fail to successfully decode some other contents of the RAM payload (e.g., one or more media access control (MAC) protocol data units (PDUs) other than the UCI).

In this case, in a third operation 615, the base station 110 may instruct the UE 120 to retransmit the random access message (e.g., as a retransmission of msgA of a 2-step RACH procedure) and/or to fall back to a 4-step RACH procedure (e.g., to transmit msg3 of a 4-step RACH procedure). In either case, the preferred downlink beam may be used for one or more messages of the RACH procedure that follow the initial random access message (e.g., transmitted in the first operation 605). For example, in some aspects, the base station 110 may transmit a RAR (e.g., msg2 or msgB') via the preferred downlink beam, in a similar manner as described above in connection with FIG. 5. The RAR (e.g., a first RAR) may include the instruction and/or an indication that the preferred downlink beam is to be used in association with the RACH procedure (e.g., for monitoring a PDCCH for retransmission of the random access message or for a new random access message, for a random access response to the retransmission or the new random access message, and/or the like). Alternatively, in some aspects, the base station 110 may transmit the RAR via a default downlink beam, and may use the preferred downlink beam for one or more RACH messages that occur after the RAR, in a similar manner as described above in connection with FIG. 5. In some aspects, the base station 110 may transmit the RAR on both the default downlink beam and the preferred downlink beam to achieve performance improvements associated with spatial diversity.

In a fourth operation 620, based at least in part on receiving the instruction in the RAR, the UE 120 may perform PDCCH monitoring for an additional random access message based at least in part on the preferred downlink beam. For example, the UE 120 may monitor for the PDCCH on the preferred downlink beam. The base station 110 may transmit a PDCCH communication on the preferred downlink beam, and the UE 120 may receive the PDCCH communication on the preferred downlink beam. The PDCCH communication may include DCI for transmission of a new RAM (e.g., a retransmission of msgA of 2-step RACH or a new transmission of msg3 of 4-step RACH), such as a resource allocation for the new RAM, an MCS for the new RAM, a timing advance for the new RAM, and/or the like.

In a fifth operation 625, the UE 120 may transmit another RAM (e.g., a second RAM) to the base station 110. As described above, the second RAM may be a retransmission of the first RAM (e.g., msgA) transmitted in the first operation 605 when the UE 120 continues to perform the 2-step RACH procedure, or may be an initial transmission of a random access message (e.g., msg3) of a 4-step RACH procedure when the UE 120 falls back to the 4-step RACH procedure. In some aspects, the UE 120 may transmit the second RAM based at least in part on a PDCCH communication, which may be received via the preferred downlink beam.

In some aspects, if the UE 120 does not successfully receive the second RAM (e.g., if the base station 110 fails to detect an uplink demodulation reference signal (DMRS) from the UE 120 in the resource(s) scheduled for the DMRS and/or the RAM payload in the PDCCH communication described in operation 620), then the base station 110 may transmit an additional RAR. In some aspects, the base station 110 may transmit the additional RAR (e.g., and/or one or more subsequent RARs if there are additional failures) if a time period associated with RAR transmissions has not elapsed. The UE 120 may continue to monitor for RARs until the end of the time period (e.g., the end of a RAR window). In some aspects, a later-received RAR in the time period may override an earlier-received RAR in the time period. In some aspects, after receiving a RAR, the UE 120 may reset a contention resolution timer (e.g., associated with the RAR window) to permit reception of additional RARs upon additional failures. In some aspects, the UE 120 may monitor multiple beams during the time period when RARs are transmitted via the default beam. For example, the UE 120 may monitor for a RAR on the default beam, and may monitor for PDCCH (as described above in operation 620) on the preferred beam.

In a sixth operation 630, based at least in part on receiving and successfully decoding the second random access message, the base station 110 may transmit another RAR (e.g., a second RAR). In some aspects, the second RAR may be transmitted via the preferred downlink beam. The second RAR may include all or a portion of msgB when the UE 120 and the base station 110 continue to perform a 2-step RACH procedure, or may be msg4 of a 4-step RACH procedure when the UE 120 and the base station 110 fall back to the 4-step RACH procedure.

In a seventh operation 635, the UE 120 may monitor for the second RAR based at least in part on the preferred downlink beam. For example, the UE 120 may perform PDCCH monitoring and/or PDSCH monitoring for the second RAR based on the preferred downlink beam.

By indicating the preferred downlink beam in the first random access message and receiving one or more communications from the base station 110 (e.g., the first RAR and/or one or more subsequent RACH communications) via the preferred downlink beam, performance may be improved. For example, communications via the preferred beam may have a higher throughput, a lower latency, a higher reliability, and/or the like as compared to communications via a non-preferred beam.

As indicated above, FIG. 6 is provided as an example. Other examples may differ from what is described with regard to FIG. 6.

Figure 7:
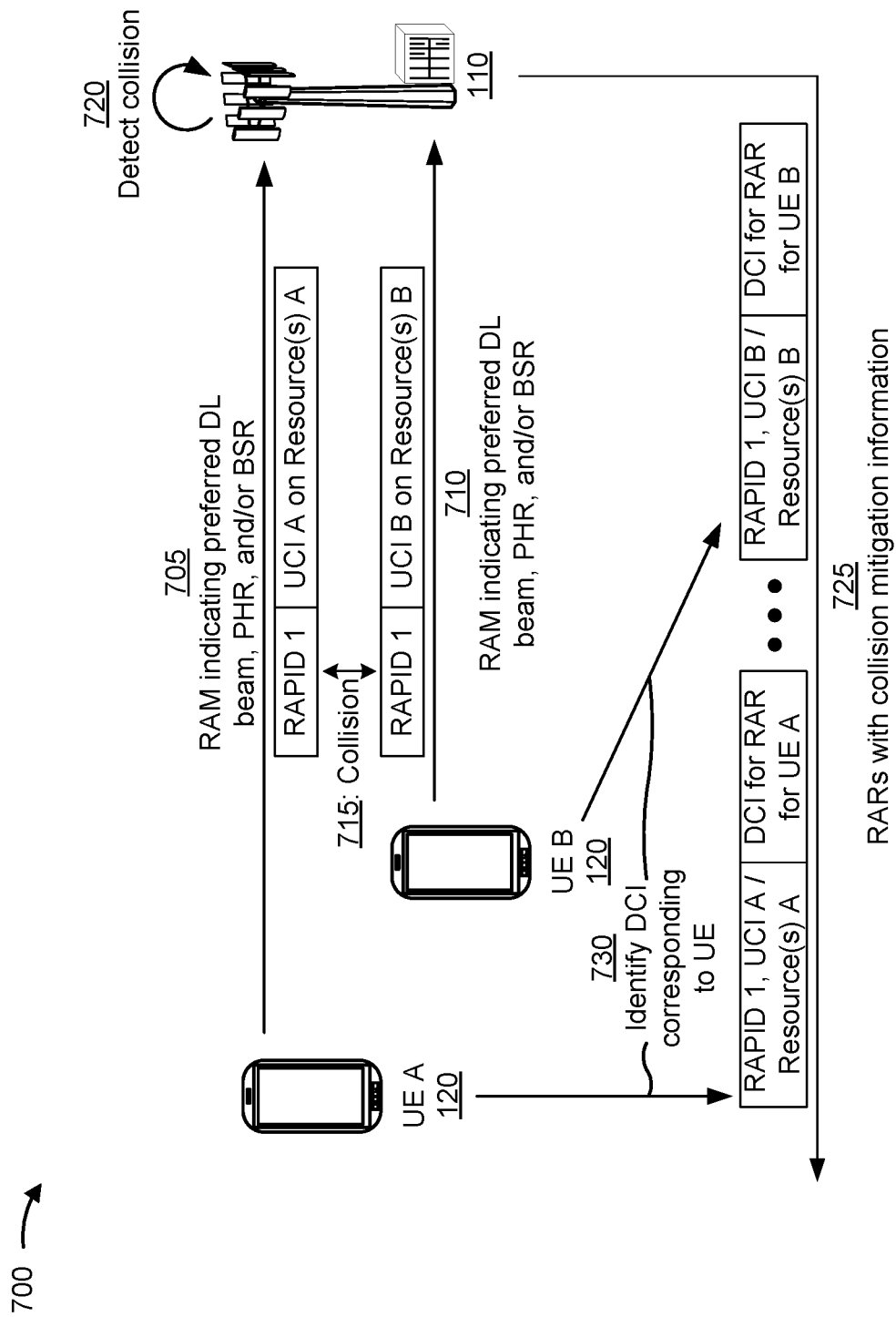

FIG. 7 is a diagram illustrating another example 700 of reporting UCI in a random access procedure, in accordance with various aspects of the present disclosure. As shown in FIG. 7, a base station 110 may communicate with multiple UEs 120, shown as UE A (e.g., a first UE 120) and UE B (e.g., a second UE 120). The base station 110 and the UEs 120 may communicate to perform a 2-step RACH procedure.

As shown by reference number 705, UE A may transmit a random access message indicating, in UCI of the random access message, a preferred downlink beam (and/or indicating a PHR, a BSR, and/or the like). The content of the UCI transmitted by UE A is represented as UCI A. UE A may transmit the random access preamble on a first set of resources (e.g., time resources, frequency resources, spatial resources, and/or the like), represented as Resource(s) A. As shown, UE A may select a preamble for the random access message, represented by a random access preamble identifier (RAPID) of 1.

As shown by reference number 710, UE B may also transmit a random access message indicating, in UCI of the random access message, a preferred downlink beam (and/or indicating a PHR, a BSR, and/or the like). The content of the UCI transmitted by UE B is represented as UCI B. UE B may transmit the random access preamble on a second set of resources (e.g., time resources, frequency resources, spatial resources, and/or the like), represented as Resource(s) B. The second set of resources may be the same as and/or may overlap with the first set of resources, or may be different from and/or non-overlapping with the first set of resources. As shown by reference number 715, UE B may select the same preamble for the random access message as the preamble selected by UE A, shown as RAPID 1. As a result, the random access messages of UE A and UE B may collide.

As shown by reference number 720, the base station 110 may detect the collision. Based at least in part on detecting the collision, the base station 110 may transmit one or more random access responses (RARs) that include collision mitigation information. The collision mitigation information included in a RAR may include, for example, a RAPID and UCI (e.g., all of the UCI or a portion of the UCI) transmitted in a random access message corresponding to the RAR, an RAPID and information that identifies one or more resources used for the UCI transmitted in the random access message corresponding to the RAR, an RAPID and a hashing identifier that is generated based at least in part on the UCI and/or the one or more resources, and/or the like.

As shown by reference number 730, a UE 120 may identify information (e.g., downlink control information (DCI)) relating to a subsequent random access message (e.g., msg3 and/or a retransmission of msgA) by analyzing contents of multiple RARs to identify a RAR corresponding to the UE 120. For example, if the RAR includes an RAPID and UCI for a corresponding random access message, the UE 120 may determine whether the UCI in the RAR matches UCI transmitted by the UE 120 in the random access message. If the UCI matches, then the UE 120 may determine that the RAR is intended for the UE 120, and may use information in the RAR (e.g., DCI for a subsequent communication, a timing advance value, a resource allocation, and/or the like) to communicate with the base station 110. If the UCI does not match, then the UE 120 may continue to monitor for a RAR corresponding to the UE 120 (or may restart a RACH procedure if a RAR for the UE 120 is not received within a time window).

As another example, if the RAR includes an RAPID and information that identifies resource(s) used to transmit UCI for a corresponding random access message, the UE 120 may determine whether the resources indicated in the RAR match the resources used by the UE 120 to transmit the UCI. If the resources match, then the UE 120 may determine that the RAR is intended for the UE 120, and may use information in the RAR to communicate with the base station 110. If the resources do not match, then the UE 120 may continue to monitor for a RAR corresponding to the UE 120 (or may restart a RACH procedure if a RAR for the UE 120 is not received within a time window).

As another example, if the RAR includes an RAPID and a hashing identifier generated from the UCI and/or the resource(s) for a corresponding random access message, the UE 120 may determine whether the hashing identifier indicated in the RAR (e.g., which is generated by the base station 110) matches a hashing identifier generated by the UE 120 (e.g., using a same hashing algorithm as the base station 110). If the hashing identifiers match, then the UE 120 may determine that the RAR is intended for the UE 120, and may use information in the RAR to communicate with the base station 110. If the hashing identifiers do not match, then the UE 120 may continue to monitor for a RAR corresponding to the UE 120 (or may restart a RACH procedure if a RAR for the UE 120 is not received within a time window).

Additionally, or alternatively, to mitigate and/or reduce the likelihood of a collision, the RAR may indicate a dedicated preamble and/or a dedicated random access occasion to be used by a UE 120 for a subsequent RACH attempt (e.g., retransmission of a random access message). For example, the base station 110 may assign a first preamble to a first UE 120, and may assign a second (different) preamble to a second UE 120 based at least in part on detecting a collision between a random access message from the first UE 120 and a random access message from the second UE 120. Additionally, or alternatively, the base station 110 may assign a first random access occasion to a first UE 120, and may assign a second (different) random access occasion to a second UE 120 based at least in part on detecting the collision. A UE 120 may use a dedicated preamble and/or a dedicated random access occasion indicated by the base station 110 for a retransmission of the random access message.

Additionally, or alternatively, to mitigate and/or reduce the likelihood of a collision, a random access radio network temporary identifier (RA-RNTI) used by a UE 120 may be generated based at least in part on a preamble selected by the UE 120 and a PUSCH occasion selected by the UE 120 for transmission of the random access message. In this way, when different UEs 120 use the same preamble, those UEs 120 may be differentiated via different RA-RNTIs if the UEs 120 use different PUSCH occasions to transmit UCI for a random access message.

Using the techniques described above may reduce the likelihood of random access message collisions, mitigate random access message collisions after such collisions have occurred, and/or permit earlier detection of random access message collisions, thereby improving network performance.

As indicated above, FIG. 7 is provided as an example. Other examples may differ from what is described with regard to FIG. 7.

Figure 8:
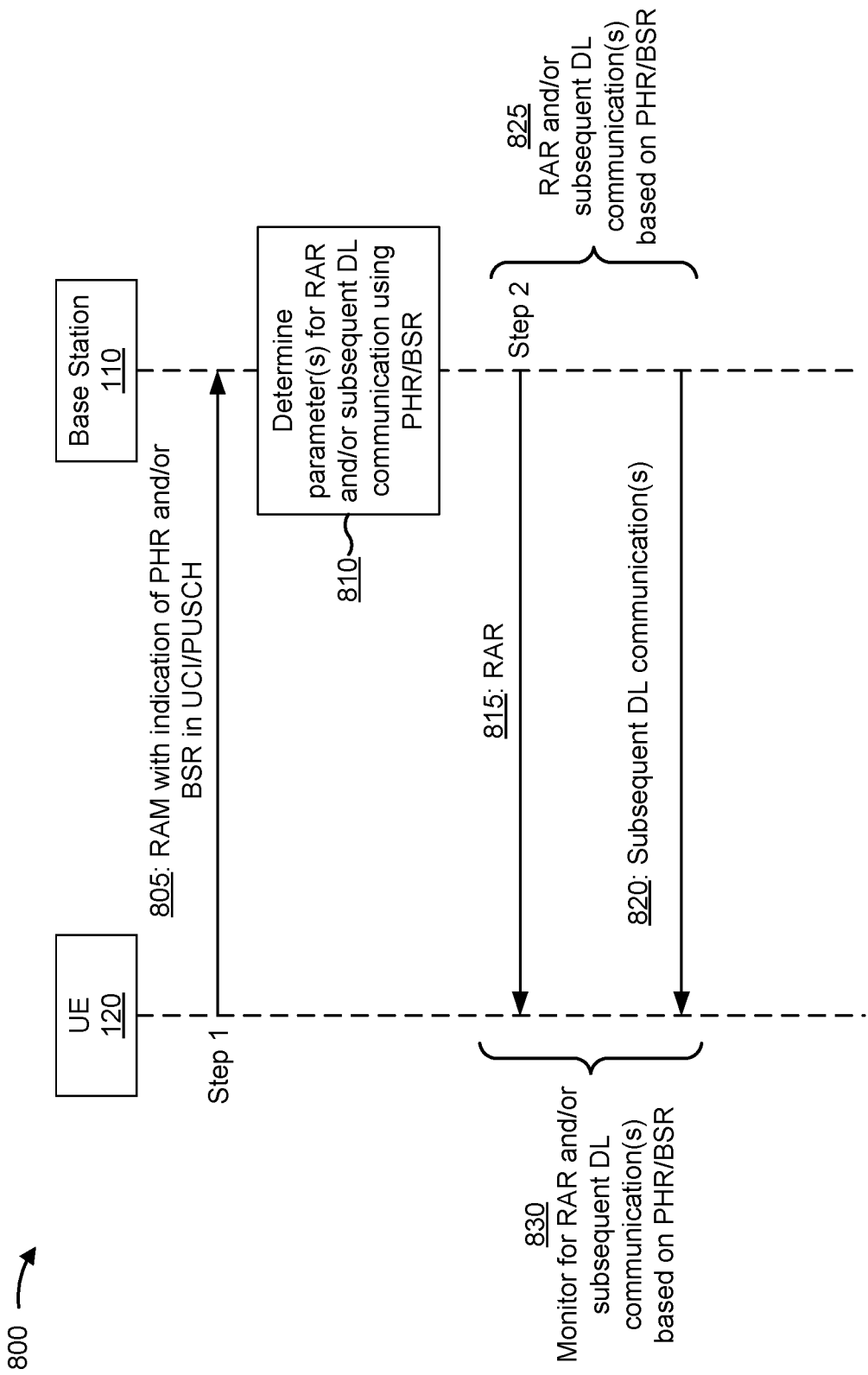

FIG. 8 is a diagram illustrating another example 800 of reporting UCI in a random access procedure, in accordance with various aspects of the present disclosure. As shown in FIG. 8, a UE 120 and a base station 110 may communicate with one another to perform a 2-step RACH procedure.

In a first operation 805, the UE 120 may transmit a power headroom report (PHR) and/or a buffer status report (BSR) in UCI of a random access message. As described above in connection with FIG. 5, the random access message may be msgA, and may include a RAM preamble and a RAM payload. The UE 120 may transmit the PHR and/or the BSR in the RAM payload, such as in UCI of the RAM payload (e.g., in a PUSCH communication included in the RAM payload). In some aspects, the UE 120 may transmit the PHR and/or the BSR in the UCI, and may not transmit the preferred downlink beam (as described above) in the UCI. In some aspects, the UE 120 may indicate the preferred downlink beam and at least one of the PHR and/or the BSR in the UCI. In some aspects, one or more indexes and/or values to be used to report the PHR and/or the BSR may be indicated to the UE 120 in system information (e.g., RMSI and/or the like).

In a second operation 810, the base station 110 may determine one or more parameters for a RAR and/or one or more subsequent downlink communications based at least in part on the PHR and/or the BSR. As described elsewhere herein, the one or more subsequent downlink communications may include one or more messages that follow the RAR and/or that follow the RACH procedure, such as a PDCCH communication (e.g., for uplink scheduling), a PDSCH communication, an RRC message, and/or the like. The one or more parameters may include, for example, a resource allocation for a communication (e.g., a set of time domain, frequency domain, and/or spatial domain resources), an MCS for the communication, a layer configuration for the communication (e.g., a number of MIMO layers to be used for the communication, one or more layer indexes, and/or the like), and/or the like.

In some aspects, the base station 110 may determine a layer configuration and/or an MCS based at least in part on the PHR. For example, the PHR may indicate whether the UE 120 has additional power headroom to support additional and/or multiple layers, whether the UE 120 has additional power headroom to support a different and/or a higher MCS, and/or the like. Additionally, or alternatively, the base station 110 may determine a resource allocation based at least in part on the BSR. For example, the BSR may indicate an amount of data queued for transmission by the UE 120, which may indicate a number of resources needed for the transmission. Thus, the base station 110 may configure an appropriate resource allocation for the UE 120. By using UCI rather than preamble partitioning to indicate a PHR and/or a BSR, network performance may be improved by avoiding preamble partitioning.

In a third operation 815, the base station 110 may transmit a RAR, in a similar manner as described elsewhere herein. In a fourth operation 820, the base station 110 may transmit the one or more subsequent downlink communications, in a similar manner as described elsewhere herein. As shown by reference number 825, at least one of the RAR or the one or more subsequent downlink communications may be based at least in part on the PHR and/or the BSR. For example, the base station 110 may determine a layer configuration and/or an MCS for the RAR and/or the one or more subsequent downlink communications based at least in part on the PHR and/or the BSR. Additionally, or alternatively, the base station 110 may determine a resource allocation to be indicated to the UE 120 in an uplink grant (e.g., in the RAR and/or in a subsequent downlink communication).

In a fifth operation 830, the UE 120 may monitor for a RAR and/or a downlink communication subsequent to the RAR based at least in part on the PHR and/or the BSR. For example, the UE 120 may monitor for a communication based at least in part on a layer configuration, an MCS, and/or the like, which may be based at least in part on the PHR and/or the BSR and/or which may be indicated to the UE 120 by the base station 110 based at least in part on the PHR and/or the BSR.

By indicating a PHR and/or a BSR in the random access message and receiving one or more communications from the base station 110 based at least in part on the PHR and/or the BSR, performance may be improved. For example, the base station 110 may configure one or more communications using the PHR and/or the BSR to achieve higher throughput, lower latency, higher reliability, and/or the like as compared to configuring such communication(s) without using the PHR and/or the BSR.

As indicated above, FIG. 8 is provided as an example. Other examples may differ from what is described with regard to FIG. 8.

Figure 9:
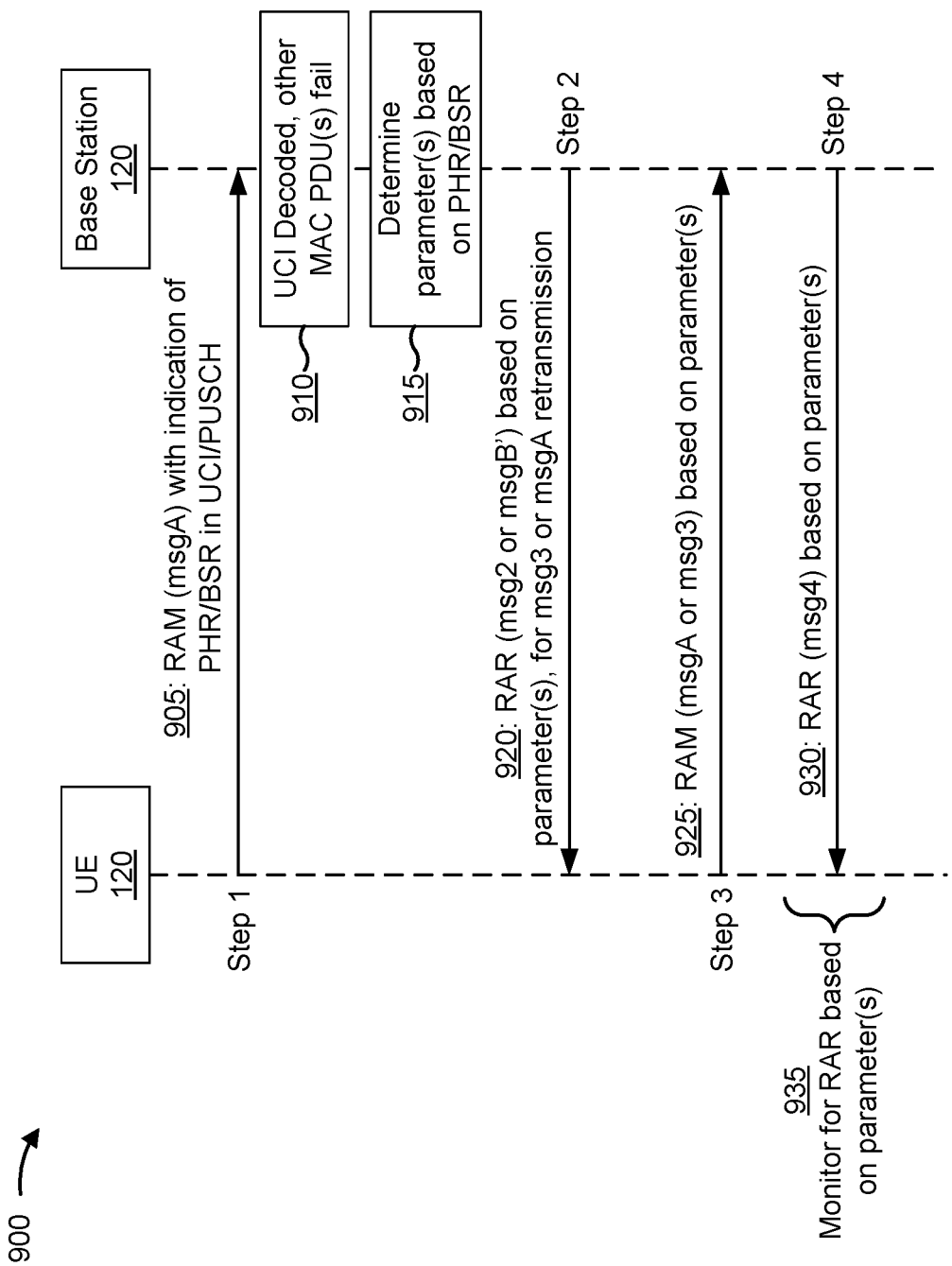

FIG. 9 is a diagram illustrating another example 900 of reporting UCI in a random access procedure, in accordance with various aspects of the present disclosure. As shown in FIG. 9, a UE 120 and a base station 110 may communicate with one another to perform a 2-step RACH procedure (but may fall back to a 4-step RACH procedure in some aspects).

In a first operation 905, the UE 120 may transmit a PHR and/or a BSR in UCI of a random access message (e.g., a first random access message), as described above in connection with FIG. 8.

In a second operation 910, the base station 110 may receive the random access message, and may attempt to decode the random access message. In some cases, the base station 110 may successfully decode the UCI (e.g., that indicates the PHR and/or the BSR), but may fail to successfully decode some other contents of the RAM payload (e.g., one or more MAC PDUs other than the UCI).

In a third operation 915, the base station 110 may determine one or more parameters, associated with a RAR to be transmitted by the base station 110, based at least in part on the PHR and/or the BSR. In some aspects, the one or more parameters may relate to an uplink grant to be included in a RAR. For example, the base station 110 calculate one or more parameters for the uplink grant (e.g., a resource allocation, a layer configuration, an MCS, and/or the like) based at least in part on the PHR and/or the BSR, in a similar manner as described above in connection with FIG. 8. The uplink grant may be an uplink grant associated with a 4-step RACH procedure, and the RAR may instruct the UE 120 to fall back to the 4-step RACH procedure and to use the uplink grant for transmission of msg3. Additionally, or alternatively, the RAR may instruct the UE 120 to retransmit the random access message (e.g., as part of a continued 2-step RACH procedure). In this case, the RAR may indicate an MCS, a resource allocation (e.g., a PUSCH resource allocation), and/or a layer configuration for the retransmission.

In a fourth operation 920, the base station 110 may transmit the RAR to the UE 120. As shown, the RAR may include msg2 or msgB', depending on whether the 2-step RACH procedure is to continue or whether the UE 120 and the base station 110 are to fall back to the 4-step RACH procedure. For 4-step RACH fallback, the RAR may include an uplink grant for msg3, and the uplink grant may indicate and/or may be determined based at least in part on one or more parameters that are determined based at least in part on the PHR and/or the BSR. For 2-step RACH, the RAR may instruct the UE 120 to retransmit the random access message, and may include one or more parameters for the retransmission.

In a fifth operation 925, the UE 120 may transmit a second random access message to the base station 110. As described above, the second RAM may be a retransmission of the first RAM (e.g., msgA) transmitted in the first operation 905 when the UE 120 continues to perform the 2-step RACH procedure, or may be an initial transmission of a random access message (e.g., msg3) of a 4-step RACH procedure when the UE 120 falls back to the 4-step RACH procedure. In some aspects, the UE 120 may transmit the second RAM based at least in part on one or more parameters indicated in the RAR. For example, the UE 120 may transmit the RAM using a resource allocation, a layer configuration, and/or an MCS indicated in the RAR.

In a sixth operation 930, based at least in part on receiving and successfully decoding the second random access message, the base station 110 may transmit a second RAR. The second RAR may include all or a portion of msgB when the UE 120 and the base station 110 continue to perform a 2-step RACH procedure, or may be msg4 of a 4-step RACH procedure when the UE 120 and the base station 110 fall back to the 4-step RACH procedure. In some aspects, the second RAR may be transmitted based at least in part on the one or more parameters (e.g., using a resource allocation, an MCS, a layer configuration, and/or the like determined based at least in part on the PHR and/or the BSR).

In a seventh operation 935, the UE 120 may monitor for the second RAR based at least in part on the one or more parameters. For example, the UE 120 may perform PDCCH monitoring and/or PDSCH monitoring for the second RAR using an indicated resource allocation, MCS, and/or the layer configuration.

By indicating a PHR and/or a BSR in the random access message and receiving one or more communications from the base station 110 based at least in part on the PHR and/or the BSR, performance may be improved. For example, the base station 110 may configure one or more communications using the PHR and/or the BSR to achieve higher throughput, lower latency, higher reliability, and/or the like as compared to configuring such communication(s) without using the PHR and/or the BSR.

As indicated above, FIG. 9 is provided as an example. Other examples may differ from what is described with regard to FIG. 9.

Figure 10:
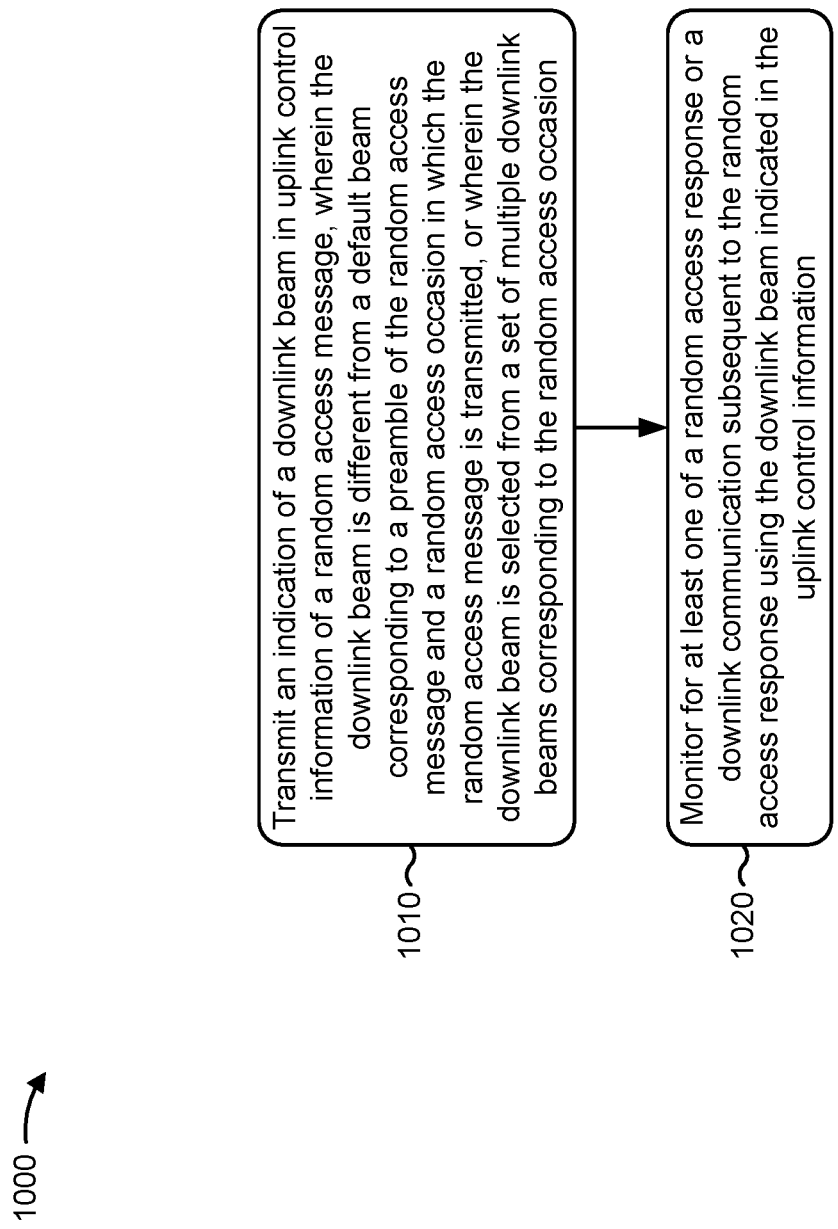
FIGS. 10-13 are diagrams illustrating example processes relating to reporting UCI in a random access procedure, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with reporting uplink control information in a random access procedure.

As shown in FIG. 10, in some aspects, process 1000 may include transmitting an indication of a downlink beam in uplink control information of a random access message, wherein the downlink beam is different from a default beam corresponding to a preamble of the random access message and a random access occasion in which the random access message is transmitted, or wherein the downlink beam is selected from a set of multiple downlink beams corresponding to the random access occasion (block 1010). For example, the UE (e.g., using transmit processor 264, controller/processor 280, memory 282, and/or the like) may transmit an indication of a downlink beam in uplink control information of a random access message, as described above. In some aspects, the downlink beam is different from a default beam corresponding to a preamble of the random access message and a random access occasion in which the random access message is transmitted. In some aspects, the downlink beam is selected from a set of multiple downlink beams corresponding to the random access occasion.

As further shown in FIG. 10, in some aspects, process 1000 may include monitoring for at least one of a random access response or a downlink communication subsequent to the random access response using the downlink beam indicated in the uplink control information (block 1020). For example, the UE (e.g., using receive processor 258, controller/processor 280, memory 282, and/or the like) may monitor for at least one of a random access response or a downlink communication subsequent to the random access response using the downlink beam indicated in the uplink control information, as described above.

Process 1000 may include additional aspects, such as any single aspect or any combination of aspects described below and/or in connection with one or more other processes described elsewhere herein.

In a first aspect, a plurality of random access occasions configured for the UE each correspond to a single default beam, wherein the downlink beam is different from the default beam corresponding to the random access occasion in which the random access message is transmitted.

In a second aspect, alone or in combination with the first aspect, a plurality of random access occasions configured for the UE each correspond to multiple default beams, wherein the multiple default beams are each associated with a different set of preambles, wherein the downlink beam is different from the default beam corresponding to the random access occasion in which the random access message is transmitted and corresponding to the preamble of the random access message.

In a third aspect, alone or in combination with one or more of the first and second aspects, the random access response is received via the default beam or via the downlink beam.

In a fourth aspect, alone or in combination with one or more of the first through third aspects, process 1000 includes monitoring at least one of the default beam or the downlink beam based at least in part on a time division multiplexing pattern indicated in system information.

In a fifth aspect, alone or in combination with one or more of the first through fourth aspects, the default beam is monitored for the random access response and the downlink beam is monitored for the downlink communication subsequent to the random access response.

In a sixth aspect, alone or in combination with one or more of the first through fifth aspects, the downlink beam is indicated using an index that identifies the downlink beam from the set of multiple downlink beams corresponding to the random access occasion.

In a seventh aspect, alone or in combination with one or more of the first through sixth aspects, a set of preambles is not partitioned among different downlink beams included in the set of multiple downlink beams.

In an eighth aspect, alone or in combination with one or more of the first through seventh aspects, process 1000 includes monitoring at least one of the downlink beam or another downlink beam included in the set of multiple downlink beams based at least in part on a time division multiplexing pattern indicated in system information.

In a ninth aspect, alone or in combination with one or more of the first through eighth aspects, the random access message is associated with a two-step random access channel procedure and the random access response instructs the UE to use the downlink beam in association with a retransmission of the random access response or to fall back to a four-step random access channel procedure.

In a tenth aspect, alone or in combination with one or more of the first through ninth aspects, the UE is configured to monitor for random access responses until an end of a random access response window.

In an eleventh aspect, alone or in combination with one or more of the first through tenth aspects, the random access response includes at least one of: a random access preamble identifier and the uplink control information transmitted in the random access message, a random access preamble identifier and information that identifies one or more resources used for the uplink control information transmitted in the random access message, or a random access preamble identifier and a hashing identifier that is based at least in part on at least one of the uplink control information or the one or more resources.

In a twelfth aspect, alone or in combination with one or more of the first through eleventh aspects, a random access radio network temporary identifier for the UE is based at least in part on the preamble of the random access message and a physical uplink shared channel occasion in which the random access message is transmitted.

In a thirteenth aspect, alone or in combination with one or more of the first through twelfth aspects, the random access response identifies at least one of a dedicated preamble or a dedicated random access occasion to be used by the UE for a subsequent random access message.

In a fourteenth aspect, alone or in combination with one or more of the first through thirteenth aspects, the downlink beam is one of a plurality of downlink beams indicated in the uplink control information of the random access message.

In a fifteenth aspect, alone or in combination with one or more of the first through fourteenth aspects, process 1000 includes monitoring at least one of the plurality of downlink beams based at least in part on a time division multiplexing pattern indicated in system information.

In a sixteenth aspect, alone or in combination with one or more of the first through fifteenth aspects, the random access response indicates a set of downlink beams to be monitored by the UE and a time division multiplexing pattern for monitoring the set of downlink beams.

In a seventeenth aspect, alone or in combination with one or more of the first through sixteenth aspects, the uplink control information further includes at least one of a power headroom report or a buffer status report.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
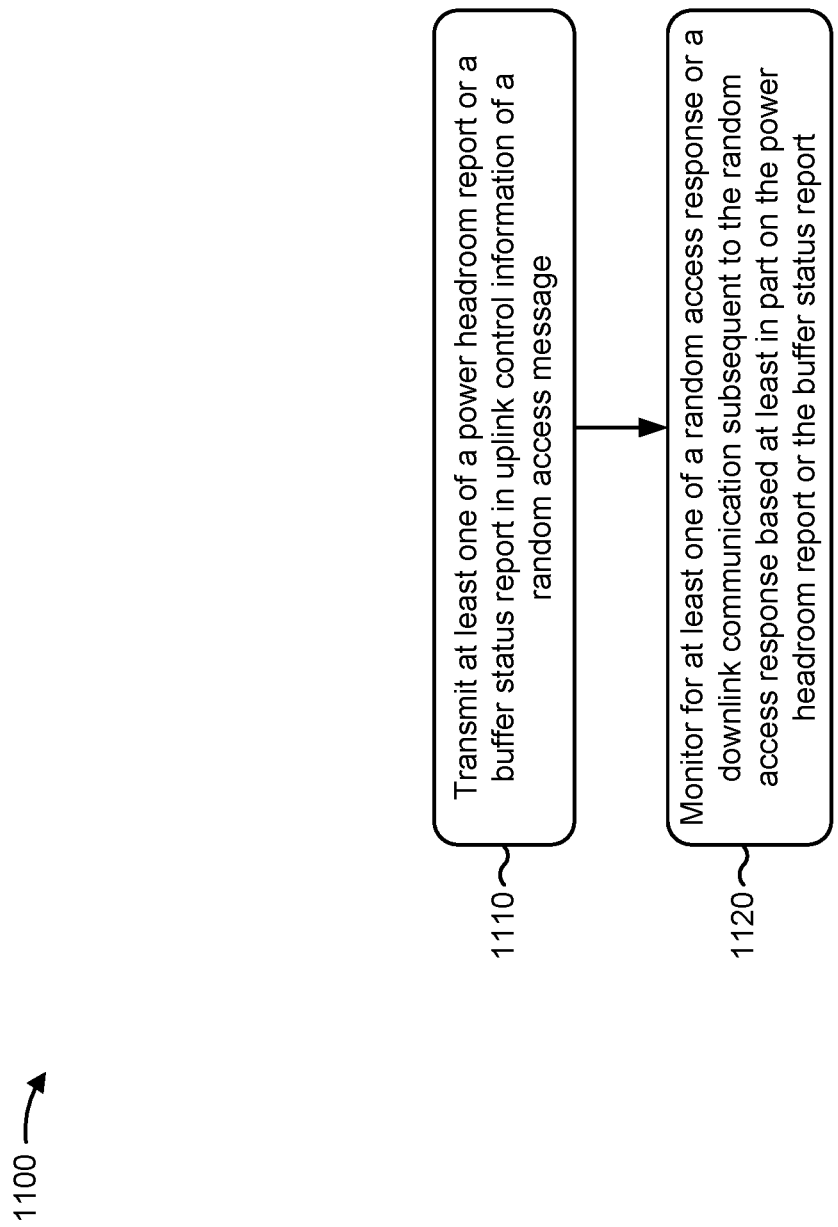

FIG. 11 is a diagram illustrating an example process 1100 performed, for example, by a UE, in accordance with various aspects of the present disclosure. Example process 1100 is an example where a UE (e.g., UE 120 and/or the like) performs operations associated with reporting uplink control information in a random access procedure.

As shown in FIG. 11, in some aspects, process 1100 may include transmitting at least one of a power headroom report or a buffer status report in uplink control information of a random access message (block 1110). For example, the UE (e.g., using transmit processor 264, controller/processor 280, memory 282, and/or the like) may transmit at least one of a power headroom report or a buffer status report in uplink control information of a random access message, as described above.

As further shown in FIG. 11, in some aspects, process 1100 may include monitoring for at least one of a random access response or a downlink communication subsequent to the random access response based at least in part on the power headroom report or the buffer status report (block 1120). For example, the UE (e.g., using receive processor 258, controller/processor 280, memory 282, and/or the like) may monitor for at least one of a random access response or a downlink communication subsequent to the random access response based at least in part on the power headroom report or the buffer status report, as described above.

Process 1100 may include additional aspects, such as any single aspect or any combination of aspects described below and/or in connection with one or more other processes described elsewhere herein.

In a first aspect, the random access message is associated with a two-step random access channel procedure and the random access response includes an uplink grant for retransmission of the random access message or fallback to a four-step random access channel procedure, wherein the uplink grant is determined based at least in part on at least one of the power headroom report or the buffer status report.

In a second aspect, alone or in combination with the first aspect, the random access response indicates one or more parameters for a retransmission of the random access message, wherein the one or more parameters are determined based at least in part on at least one of the power headroom report or the buffer status report.

In a third aspect, alone or in combination with one or more of the first and second aspects, the one or more parameters include at least one of a resource allocation, a modulation and coding scheme, or a layer configuration.

In a fourth aspect, alone or in combination with one or more of the first through third aspects, the random access response includes at least one of: a random access preamble identifier and the uplink control information transmitted in the random access message, a random access preamble identifier and information that identifies one or more resources used for the uplink control information transmitted in the random access message, or a random access preamble identifier and a hashing identifier that is based at least in part on at least one of the uplink control information or the one or more resources.

In a fifth aspect, alone or in combination with one or more of the first through fourth aspects, a random access radio network temporary identifier for the UE is based at least in part on a preamble of the random access message and a random access occasion in which the random access message is transmitted.

In a sixth aspect, alone or in combination with one or more of the first through fifth aspects, the random access response identifies at least one of a dedicated preamble or a dedicated random access occasion to be used by the UE for a subsequent random access message.

In a seventh aspect, alone or in combination with one or more of the first through sixth aspects, the uplink control information further indicates a downlink beam, wherein the downlink beam is different from a default beam corresponding to a preamble of the random access message and a random access occasion in which the random access message is transmitted, or wherein the downlink beam is selected from a set of multiple downlink beams corresponding to the random access occasion.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
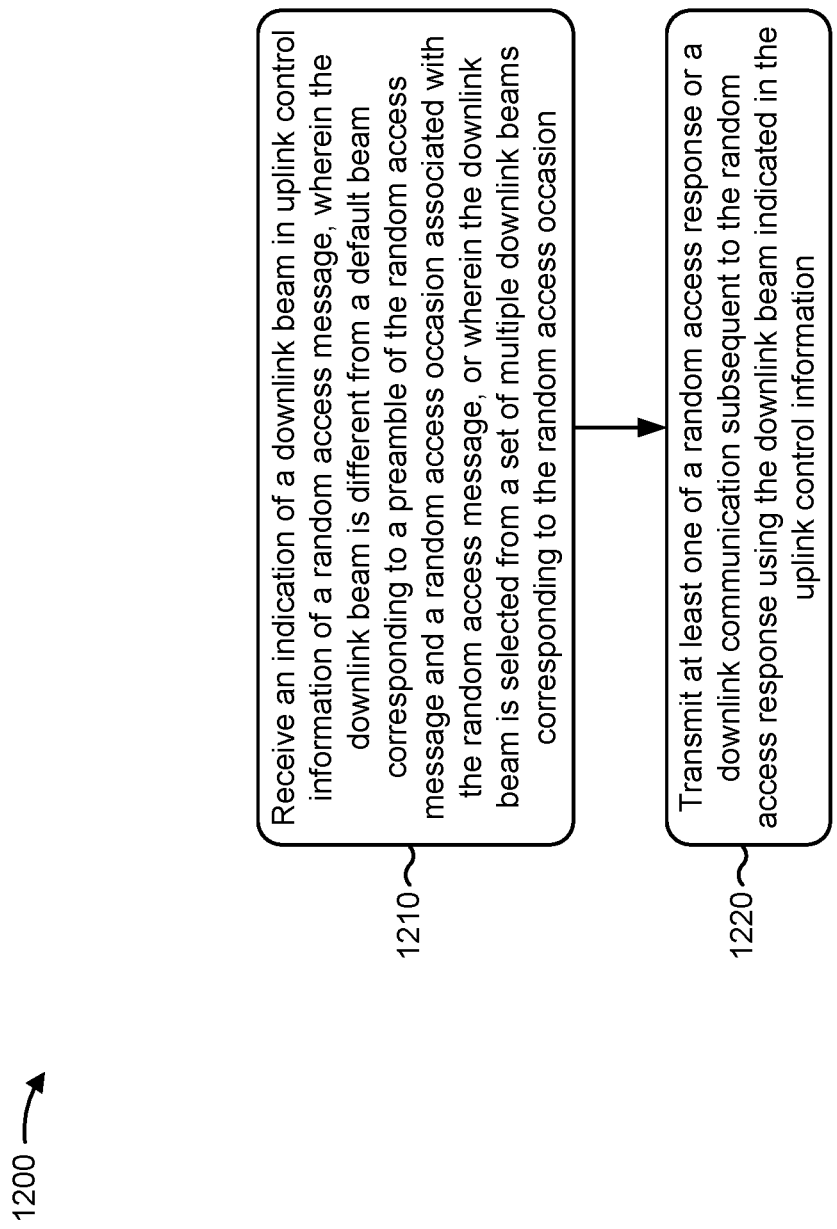

FIG. 12 is a diagram illustrating an example process 1200 performed, for example, by a base station, in accordance with various aspects of the present disclosure. Example process 1200 is an example where a base station (e.g., base station 110 and/or the like) performs operations associated with reporting uplink control information in a random access procedure.

As shown in FIG. 12, in some aspects, process 1200 may include receiving an indication of a downlink beam in uplink control information of a random access message, wherein the downlink beam is different from a default beam corresponding to a preamble of the random access message and a random access occasion associated with the random access message, or wherein the downlink beam is selected from a set of multiple downlink beams corresponding to the random access occasion (block 1210). For example, the base station (e.g., using receive processor 238, controller/processor 240, memory 242, and/or the like) may receive an indication of a downlink beam in uplink control information of a random access message, as described above. In some aspects, the downlink beam is different from a default beam corresponding to a preamble of the random access message and a random access occasion associated with the random access message. In some aspects, the downlink beam is selected from a set of multiple downlink beams corresponding to the random access occasion.

As further shown in FIG. 12, in some aspects, process 1200 may include transmitting at least one of a random access response or a downlink communication subsequent to the random access response using the downlink beam indicated in the uplink control information (block 1220). For example, the base station (e.g., using transmit processor 220, controller/processor 240, memory 242, and/or the like) may transmit at least one of a random access response or a downlink communication subsequent to the random access response using the downlink beam indicated in the uplink control information, as described above.

Process 1200 may include additional aspects, such as any single aspect or any combination of aspects described below and/or in connection with one or more other processes described elsewhere herein.

In a first aspect, a plurality of random access occasions each correspond to a single default beam, wherein the downlink beam is different from the default beam corresponding to the random access occasion in which the random access message is transmitted.

In a second aspect, alone or in combination with the first aspect, a plurality of random access occasions each correspond to multiple default beams, wherein the multiple default beams are each associated with a different set of preambles, wherein the downlink beam is different from the default beam corresponding to the random access occasion in which the random access message is transmitted and corresponding to the preamble of the random access message.

In a third aspect, alone or in combination with one or more of the first and second aspects, the random access response is transmitted via the default beam or via the downlink beam.

In a fourth aspect, alone or in combination with one or more of the first through third aspects, process 1200 includes transmitting, in system information, a time division multiplexing pattern to be used for monitoring at least one of the default beam or the downlink beam.

In a fifth aspect, alone or in combination with one or more of the first through fourth aspects, the random access response is transmitted via the default beam and the downlink communication subsequent to the random access response is transmitted via the downlink beam.

In a sixth aspect, alone or in combination with one or more of the first through fifth aspects, the downlink beam is indicated using an index that identifies the downlink beam from the set of multiple downlink beams corresponding to the random access occasion.

In a seventh aspect, alone or in combination with one or more of the first through sixth aspects, a set of preambles is not partitioned among different downlink beams included in the set of multiple downlink beams.

In an eighth aspect, alone or in combination with one or more of the first through seventh aspects, process 1200 includes transmitting, in system information, a time division multiplexing pattern to be used for monitoring at least one of the downlink beam or another downlink beam included in the set of multiple downlink beams.

In a ninth aspect, alone or in combination with one or more of the first through eighth aspects, the random access message is associated with a two-step random access channel procedure and the random access response includes an instruction to use the downlink beam in association with a retransmission of the random access response or to fall back to a four-step random access channel procedure.

In a tenth aspect, alone or in combination with one or more of the first through ninth aspects, the base station is configured to retransmit random access responses upon detecting a failure until an end of a random access response window.

In an eleventh aspect, alone or in combination with one or more of the first through tenth aspects, the random access response includes at least one of: a random access preamble identifier and the uplink control information received in the random access message, a random access preamble identifier and information that identifies one or more resources used for the uplink control information received in the random access message, or a random access preamble identifier and a hashing identifier that is based at least in part on at least one of the uplink control information or the one or more resources.

In a twelfth aspect, alone or in combination with one or more of the first through eleventh aspects, a random access radio network temporary identifier is generated based at least in part on the preamble of the random access message and a physical uplink shared channel occasion in which the random access message is transmitted.

In a thirteenth aspect, alone or in combination with one or more of the first through fourteenth aspects, the random access response identifies at least one of a dedicated preamble or a dedicated random access occasion to be used for a subsequent random access message.

In a fourteenth aspect, alone or in combination with one or more of the first through thirteenth aspects, the downlink beam is one of a plurality of downlink beams indicated in the uplink control information of the random access message.

In a fifteenth aspect, alone or in combination with one or more of the first through fourteenth aspects, process 1200 includes transmitting, in system information, a time division multiplexing pattern for monitoring at least one of the plurality of downlink beams.

In a sixteenth aspect, alone or in combination with one or more of the first through fifteenth aspects, the random access response indicates a set of downlink beams to be monitored and a time division multiplexing pattern for monitoring the set of downlink beams.

In a seventeenth aspect, alone or in combination with one or more of the first through sixteenth aspects, the uplink control information further includes at least one of a power headroom report or a buffer status report.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
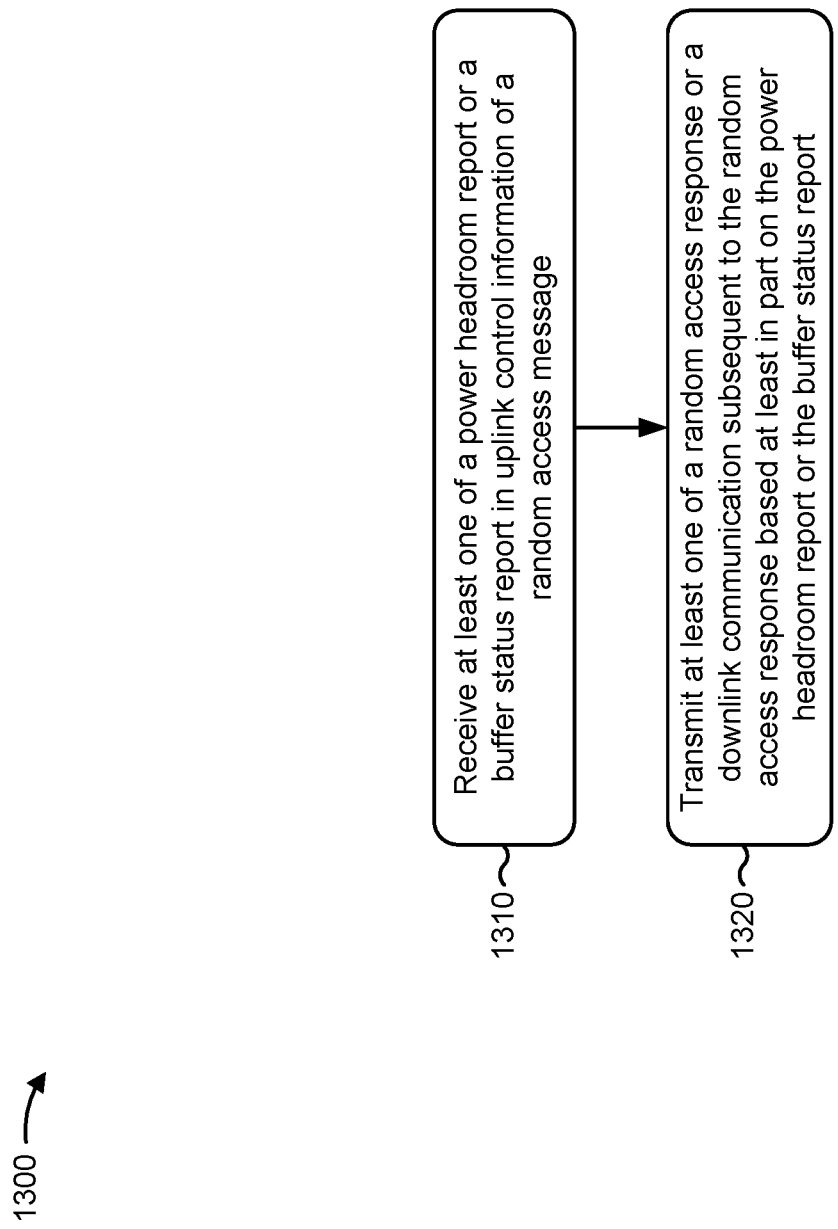

FIG. 13 is a diagram illustrating an example process 1300 performed, for example, by a base station, in accordance with various aspects of the present disclosure. Example process 1300 is an example where a base station (e.g., base station 110 and/or the like) performs operations associated with reporting uplink control information in a random access procedure.

As shown in FIG. 13, in some aspects, process 1300 may include receiving at least one of a power headroom report or a buffer status report in uplink control information of a random access message (block 1310). For example, the base station (e.g., using receive processor 238, controller/processor 240, memory 242, and/or the like) may receive at least one of a power headroom report or a buffer status report in uplink control information of a random access message, as described above.

As further shown in FIG. 13, in some aspects, process 1300 may include transmitting at least one of a random access response or a downlink communication subsequent to the random access response based at least in part on the power headroom report or the buffer status report (block 1320). For example, the base station (e.g., using transmit processor 220, controller/processor 240, memory 242, and/or the like) may transmit at least one of a random access response or a downlink communication subsequent to the random access response based at least in part on the power headroom report or the buffer status report, as described above.

Process 1300 may include additional aspects, such as any single aspect or any combination of aspects described below and/or in connection with one or more other processes described elsewhere herein.

In a first aspect, the one or more parameters include at least one of a resource allocation, a modulation and coding scheme, or a layer configuration.

In a second aspect, alone or in combination with the first aspect, the uplink control information further indicates a downlink beam, wherein the downlink beam is different from a default beam corresponding to a preamble of the random access message and a random access occasion in which the random access message is transmitted, or wherein the downlink beam is selected from a set of multiple downlink beams corresponding to the random access occasion.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, in a random access occasion and using a first set of resources, a first random access message, that is a first step of a two-step random access channel (RACH) procedure, comprising:
      a first random access preamble identifier corresponding to a preamble of the first random access message, and
      first uplink control information (UCI) comprising an indication of a downlink beam,
         wherein the downlink beam is different from a default beam corresponding to the preamble of the first random access message and further to the random access occasion, or
         wherein the downlink beam is selected from a set of multiple downlink beams corresponding to the random access occasion;
   receiving, based at least in part on transmitting the first random access message, a first random access response comprising:
      a second random access preamble identifier,
      at least one of:
         at least a portion of a second UCI, or
         information identifying a second set of resources, and
      an indication to fall back to a four-step RACH procedure;
   transmitting a second random access message, of the four-step RACH procedure, based at least in part on:
      the first random access preamble identifier matching the second random access preamble identifier, and
      at least one of:
         at least a portion of the first UCI matching the at least the portion of the second UCI, or
         the first set of resources matching the second set of resources; and
   receiving, using the downlink beam and based at least in part on transmitting the second random access message, a second random access response of the four-step RACH procedure.

2. The method of claim 1, wherein each of a plurality of random access occasions configured for the UE corresponds to a single default beam, and wherein the downlink beam is different from the default beam corresponding to the random access occasion in which the first random access message is transmitted.

3. The method of claim 1, wherein each of a plurality of random access occasions configured for the UE corresponds to multiple default beams, wherein the multiple default beams are each associated with a different set of preambles, and wherein the downlink beam is different from the default beam corresponding to the random access occasion in which the first random access message is transmitted and corresponding to the preamble of the first random access message.

4. The method of claim 1, wherein the downlink beam is indicated using an index that identifies the downlink beam from the set of multiple downlink beams corresponding to the random access occasion.

5. The method of claim 1, wherein a set of preambles is not partitioned among different downlink beams included in the set of multiple downlink beams.

6. The method of claim 1, wherein the first random access response instructs the UE to use the downlink beam in association with the second random access response.

7. The method of claim 1, further comprising:
   monitoring for random access responses, including the first random access response and a third random access response, until an end of a random access response window,
      wherein the third random access response comprises at least one of:
         a third random access preamble identifier different from the first random access preamble identifier and the second random access preamble identifier, or
      at least one of:
         at least a portion of a third UCI different from the first UCI and the second UCI, or
         information identifying a third set of resources different from the first set of resources and the second set of resources.

8. The method of claim 1, wherein a random access radio network temporary identifier for the UE is based at least in part on the preamble of the first random access message and a physical uplink shared channel occasion in which the first random access message is transmitted.

9. The method of claim 1, wherein the first random access response identifies at least one of a dedicated preamble or a dedicated random access occasion to be used by the UE for the second random access message.

10. The method of claim 1, wherein the downlink beam is one of a plurality of downlink beams indicated in the UCI of the first random access message.

11. The method of claim 10, wherein the first random access response indicates a set of downlink beams to be monitored by the UE and a time division multiplexing pattern indicated in system information.

12. The method of claim 1, wherein the UCI further includes at least one of a power headroom report or a buffer status report.

13. A method of wireless communication performed by a network entity, comprising:
   receiving, in a random access occasion and using a first set of resources, a first random access message, that is a first step of a two-step random access channel (RACH) procedure, comprising:
      a first random access preamble identifier corresponding to a preamble of the first random access message, and
      first uplink control information (UCI) comprising an indication of a downlink beam,
         wherein the downlink beam is different from a default beam corresponding to the preamble of the first random access message and further to the random access occasion, or
         wherein the downlink beam is selected from a set of multiple downlink beams corresponding to the random access occasion;
   transmitting, based at least in part on receiving the first random access message, a first random access response comprising:
      a second random access preamble identifier,
      at least one of:
         at least a portion of a second UCI, or
         information identifying a second set of resources, and
      an indication to fall back to a four-step RACH procedure;

receiving a second random access message, of the four-step RACH procedure, based at least in part on:
the first random access preamble identifier matching the second random access preamble identifier, and
at least one of:
at least a portion of the first UCI matching the at least the portion of the second UCI, or
the first set of resources matching the second set of resources; and
transmitting, using the downlink beam and based at least in part on receiving the second random access message, a second random access response of the four-step RACH procedure.

14. The method of claim 13, wherein each of a plurality of random access occasions corresponds to a single default beam, and wherein the downlink beam is different from the default beam corresponding to the random access occasion in which the first random access message is transmitted.

15. The method of claim 13, wherein each of a plurality of random access occasions corresponds to multiple default beams, wherein the multiple default beams are each associated with a different set of preambles, and wherein the downlink beam is different from the default beam corresponding to the random access occasion in which the first random access message is transmitted and corresponding to the preamble of the first random access message.

16. The method of claim 13, further comprising:
transmitting, during a random access response window, random access responses including the first random access response and a third random access response, wherein the third random access response comprises at least one of:
a third random access preamble identifier different from the first random access preamble identifier and the second random access preamble identifier, or
at least one of:
at least a portion of a third UCI different from the first UCI and the second UCI, or
information identifying a third set of resources different from the first set of resources and the second set of resources.

17. A user equipment (UE), comprising:
one or more memories; and
one or more processors, coupled to the one or more memories, configured to:
transmit, in a random access occasion and using a first set of resources, a first random access message, that is a first step of a two-step random access channel (RACH) procedure, comprising:
a first random access preamble identifier corresponding to a preamble of the first random access message, and
first uplink control information (UCI) comprising an indication of a downlink beam,
wherein the downlink beam is different from a default beam corresponding to the preamble of the first random access message and further to the random access occasion, or
wherein the downlink beam is selected from a set of multiple downlink beams corresponding to the random access occasion;
receive, based at least in part on transmitting the first random access message, a first random access response comprising:
a second random access preamble identifier,
at least one of:
at least a portion of a second UCI, or
information identifying a second set of resources, and
an indication to fall back to a four-step RACH procedure;
transmit a second random access message, of the four-step RACH procedure, based at least in part on:
the first random access preamble identifier matching the second random access preamble identifier, and
at least one of:
at least a portion of the first UCI matching the at least the portion of the second UCI, or
the first set of resources matching the second set of resources; and
receive, using the downlink beam and based at least in part on transmitting the second random access message, a second random access response of the four-step RACH procedure.

18. The UE of claim 17, wherein each of a plurality of random access occasions configured for the UE corresponds to a single default beam, and wherein the downlink beam is different from the default beam corresponding to the random access occasion in which the first random access message is transmitted.

19. The UE of claim 17, wherein each of a plurality of random access occasions configured for the UE corresponds to multiple default beams, wherein the multiple default beams are each associated with a different set of preambles, and wherein the downlink beam is different from the default beam corresponding to the random access occasion in which the first random access message is transmitted and corresponding to the preamble of the first random access message.

20. The UE of claim 17, wherein the downlink beam is indicated using an index that identifies the downlink beam from the set of multiple downlink beams corresponding to the random access occasion.

21. The UE of claim 17, wherein a set of preambles is not partitioned among different downlink beams included in the set of multiple downlink beams.

22. The UE of claim 17, wherein the one or more processors are further configured to:
identify the downlink beam as a preferred downlink beam different from the default beam corresponding to the preamble of the first random access message and further to the random access occasion, and
wherein the first random access message is transmitted based at least in part on identifying the downlink beam as the preferred downlink beam.

23. The UE of claim 17, wherein the one or more processors are further configured to:
identify the downlink beam, as a preferred downlink beam, from the set of multiple downlink beams corresponding to the random access occasion,
wherein the first random access message is transmitted based at least in part on identifying the downlink beam as the preferred downlink beam.

24. The UE of claim 17, wherein the first random access response instructs the UE to use the downlink beam in association with the second random access response.

25. The UE of claim 17, wherein the one or more processors are further configured to:
monitor for random access responses, including the first random access response and a third random access response, until an end of a random access response window, wherein the third random access response comprises at least one of:
a third random access preamble identifier different from the first random access preamble identifier and the second random access preamble identifier, or
at least one of:
at least a portion of a third UCI different from the first UCI and the second UCI, or
information identifying a third set of resources different from the first set of resources and the second set of resources.

26. The UE of claim 17, wherein the first random access response identifies at least one of a dedicated preamble or a dedicated random access occasion to be used by the UE for the second random access message.

27. A network entity, comprising:
one or more memories; and
one or more processors, coupled to the one or more memories, configured to:
receive, in a random access occasion and using a first set of resources, a first random access message, that is a first step of a two-step random access channel (RACH) procedure, comprising:
a first random access preamble identifier corresponding to a preamble of the first random access message, and
first uplink control information (UCI) comprising an indication of a downlink beam,
wherein the downlink beam is different from a default beam corresponding to the preamble of the first random access message and further to the random access occasion, or
wherein the downlink beam is selected from a set of multiple downlink beams corresponding to the random access occasion;
transmit, based at least in part on transmitting the first random access message, a first random access response comprising:
a second random access preamble identifier,
at least one of:
at least a portion of a second UCI, or
information identifying a second set of resources, and
an indication to fall back to a four-step RACH procedure;
receive a second random access message, of the four-step RACH procedure, based at least in part on:
the first random access preamble identifier matching the second random access preamble identifier, and
at least one of:
at least a portion of the first UCI matching the at least the portion of the second UCI, or
the first set of resources matching the second set of resources; and
transmit, using the downlink beam and based at least in part on transmitting the second random access message, a second random access response of the four-step RACH procedure.

28. The network entity of claim 27, wherein each of a plurality of random access occasions corresponds to a single default beam, and wherein the downlink beam is different from the default beam corresponding to the random access occasion in which the first random access message is transmitted.

29. The network entity of claim 27, wherein the one or more processors are further configured to:
transmit, during a random access response window, random access responses including the first random access response and a third random access response,
wherein the third random access response comprises at least one of:
a third random access preamble identifier different from the first random access preamble identifier and the second random access preamble identifier, or
at least one of:
at least a portion of a third UCI different from the first UCI and the second UCI, or
information identifying a third set of resources different from the first set of resources and the second set of resources.

* * * * *